US006988132B2

(12) United States Patent
Horvitz

(10) Patent No.: US 6,988,132 B2
(45) Date of Patent: Jan. 17, 2006

(54) SYSTEM AND METHOD FOR IDENTIFYING AND ESTABLISHING PREFERRED MODALITIES OR CHANNELS FOR COMMUNICATIONS BASED ON PARTICIPANTS' PREFERENCES AND CONTEXTS

(75) Inventor: Eric Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 854 days.

(21) Appl. No.: 09/982,306

(22) Filed: Oct. 17, 2001

(65) Prior Publication Data

US 2002/0174199 A1 Nov. 21, 2002

Related U.S. Application Data

(63) Continuation-in-part of application No. 09/809,142, filed on Mar. 15, 2001.

(51) Int. Cl.
*G06F 15/177* (2006.01)
(52) U.S. Cl. ............ 709/220; 709/225; 709/227; 709/228; 709/229; 709/240
(58) Field of Classification Search .......... 709/220, 709/225, 227, 228, 229, 240
See application file for complete search history.

(56) References Cited

U.S. PATENT DOCUMENTS

| | | | |
|---|---|---|---|
| 5,513,126 A * | 4/1996 | Harkins et al. | 709/228 |
| 5,615,342 A | 3/1997 | Johnson | |
| 5,623,422 A * | 4/1997 | Williams | 709/240 |
| 5,689,642 A * | 11/1997 | Harkins et al. | 709/207 |
| 5,812,865 A | 9/1998 | Theimer et al. | |
| 5,893,075 A | 4/1999 | Plainfield et al. | |

(Continued)

OTHER PUBLICATIONS

Carlson, J., et al.; "Channel Expansion Theory and the Experiential Nature of Media Richness Perceptions", *Academy of Management Journal*, vol. 42, No. 2, Apr. 1, 1999, p. 153-170.

(Continued)

*Primary Examiner*—Kim Huynh
*Assistant Examiner*—Mohammad O. Farooq
(74) *Attorney, Agent, or Firm*—Amin & Turocy, LLP

(57) ABSTRACT

A system and method for identifying and establishing preferred modalities or channels for communications based on participants' preferences and capabilities is provided. In one approach, the system attempts to optimize the inferred or directly accessed preferences of a contactee given the accessed or inferred preferences, capabilities and goals of the contactor while keeping the rationale and context of the contactee private. Such optimization can be achieved using preferences and policies concerning handling the attempted contact based on a deterministic specification or through inferring context, content and task under uncertainty by employing decision-theoretic inferences to attempt to maximize the expected utility of the communication to the contactee. The methods may include a consideration of metadata within a standard schema that is transmitted along with a communication attempt, representing information about such attributes as the identity of the contactor, the task at hand, the overall context of the contactor, and the communication capabilities available to the contactor. The invocation of the communication service may be performed in a variety of ways, including single button invocations, and via a communication service that is more deeply integrated with other applications and functionalities. The service can also include automated rescheduling of communications based on a consideration of forecasts of availability of both the contactor and contactee.

43 Claims, 10 Drawing Sheets

U.S. PATENT DOCUMENTS

| | | | |
|---|---|---|---|
| 5,931,913 A * | 8/1999 | Meriwether et al. | 709/227 |
| 6,112,098 A | 8/2000 | Flint et al. | |
| 6,163,683 A | 12/2000 | Dunn et al. | |
| 6,167,253 A * | 12/2000 | Farris et al. | 455/412.2 |
| 6,167,450 A | 12/2000 | Angwin et al. | |
| 6,188,905 B1 | 2/2001 | Rudrapatna et al. | |
| 6,272,146 B1 | 8/2001 | Bowater et al. | |
| 6,336,194 B1 | 1/2002 | Dahman et al. | |
| 6,385,454 B1 | 5/2002 | Bahl et al. | |
| 6,438,217 B1 | 8/2002 | Huna | |
| 6,438,603 B1 | 8/2002 | Ogus | |
| 6,463,265 B1 | 10/2002 | Cohen et al. | |

OTHER PUBLICATIONS

Horvitz, E., et al.; "Decision Theory in Expert Systems and Artificial Intelligence", *International Journal Of Approximate Reasoning*, Jul. 1988, p. 1-39.

Horvitz, E., et al.; "Attention-Sensitive Alerting". *Proceedings of UAI '99, Conference on Uncertainty and Artificial Intelligence*, Jul. 1999, p. 305-313.

Kaushal Kurapati, Srinivas Gutta, David Schaffer, Jacquelyn Martino, and John Zimmerman, A Multi-Agent TV Recorder, Adaptive Systems Department, Philips Research Briarcliff, 2001, 8 pages.

Eric J. Horvitz and Adrian C. Klein, "Utility-Based Abstraction and Categorization", Palo Alto Laboratory, Rockwell International Research, 1993, 8 pages.

Eric J. Horvitz, John S. Breese and Max Henrion, "Decision Theory in Expert Systems and Artificial Intelligence", Jul. 1988, 38 pages.

Eric Horvitz, Andy Jacobs and David Hovel, "Attention-Sensitive Alerting", Microsoft Research, Jul. 1999, 10 pages.

Andrew Silver, John Larkins and Dave Stringer, "Unified Network Presence Management", Nortel Networks Wireless Solutions, 6 pages.

European Search Report dated Aug. 28, 2003, for International Application Serial No. 02000906.4-1244-.

* cited by examiner

SYSTEM AND METHOD FOR IDENTIFYING AND ESTABLISHING PREFERRED MODALITIES OR CHANNELS FOR COMMUNICATIONS BASED ON PARTICIPANTS' PREFERENCES AND CONTEXTS

CROSS-REFERENCE TO RELATED APPLICATION

This application is a continuation-in-part of U.S. patent application Ser. No. 09/809,142, which was filed Mar. 15, 2001, entitled System and Method For Identifying and Establishing Preferred Modalities or Channels for Communications Based on Participants' Preferences and Contexts.

TECHNICAL FIELD

The present invention relates generally to policies, including, in one example of the system, decision-theoretic policies, for identifying and establishing data communications and more particularly to facilitating optimal communication links between contactors and contactees based on deterministic and/or uncertain contactee and/or contactor preferences, capabilities and context, both present and predicted.

BACKGROUND OF THE INVENTION

As the number of possible communication modalities between contactors and contactees has increased, it has become increasingly valuable to identify and choose optimal channel(s) by which communications are carried out to facilitate maximizing the utility of a data communication. For example, communicating parties may be able to communicate by computer (e.g., email, voice over IP, collaborative editing), by telephone (e.g., POTS, cell phone, satellite phone), face to face (e.g., personal meeting, video conference) and/or other methods, with such communication employing one or more channels (e.g., phone and collaborative editing). Maximizing the utility or expected utility of such communications may depend on the identity of the parties, the type of communication equipment available to the parties, the type of equipment used to do the initial signaling, the location of the parties and in what activities, if any, the parties are engaged or are likely to be engaged in the future.

By way of illustration, a first contactee may be employing a first tool and be intensely focused on an important task and thus may not desire to be interrupted via real-time communications except from select people whose desired communication concerns the important task. But a second contactee may be employing no tools and be lightly focused on an unimportant task and thus may not mind being interrupted via real-time communications from colleagues concerning a variety of topics. Conventionally, the contactor had limited means, if any, to determine which, if any, communication method(s) would be best employed to communicate with a contactee (e.g., contacting the contactee's secretary to figure out how and when to contact the contactee). Similarly, the contactee had limited contact control methods (e.g., leaving the phone off the hook, ignoring emails, disabling an email application, leaving instructions with a secretary). Thus, the preferences and needs of the contactees and contactors may not have been observed.

Beyond considerations of real-time methods versus methods that allow users to send potentially disruptive real-time disruptions into an asynchronous (store and forward) communication format (e.g., voicemail, email), a contactee may have preferences, depending on the contactor and the context at hand, for a particular modality. For example, a contactee may prefer to receive an instant message on an important document while working on that document to facilitate cutting and pasting from the instant message, rather than receiving a real-time phone call that would require transcribing the caller's comments. Again, conventionally the contactee had limited means, if any, to have such preferences observed (e.g., a well-trained secretary, considerate colleagues) which often lead to unfulfilled preferences and unwanted interruptions.

While conventional communications between two communicating parties was complicated, identifying and scheduling communications that optimized the utility of a communication between multiple parties (e.g., group meeting, group teleconference) was even more complicated, with the identification, scheduling, and initiating often consuming more time and resources than the actual communication. Such scheduling and initiating problems were exacerbated when the schedulers and initializers did not have complete information concerning the parties.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a system and method for determining optimal communication modalities between contactors and contactees based on information, either complete or incomplete, associated with the contactees and/or contactors. To preserve the privacy of the contactee, contactee information employed in determining the optimal communication modality may typically not be shared with the contactor. Based on the identified optimal communication modalities, one or more communications may be scheduled, calendared and/or initiated in real-time between the contactor and contactee. The scheduled communication may rely on the current context and capabilities of the communicating parties and/or on predictions concerning the likelihoods that different communication modalities will become available and/or communicating party contexts will become more optimal. Alternatively and/or additionally, the present invention may display to the contactor the contactee's current list, ranked in order of preference based on the information being considered. In other situations, a best means may be displayed, or simply invoked.

The method can consider the optimization of a measure of priority or value for communicating parties and additionally and/or alternatively, for the contactee (including the contactee's preferences about the contactor's preferences). In another example aspect of the present invention, one or more policies may be established according to the policies of an organization, considering the preferences of contactees and contactors, but combining these at the level of the enterprise employing the participants.

Considering now a method whereby the selected communication satisfies a set of polices specified by the contactee(s), and secondarily (via preferences of the contactee about the contactor's preferences) that of the contactor(s) concerning communications. In a general formulation of this method, given communication and collaboration preferences expressed as utility functions, beliefs about context, content and communications expressed as probability distributions, and a set of decision alternatives concerning communications (e.g., establish a real-time telephony connection now, pop up an email composition form on the contactor's screen, route the contactor to voicemail, etc.), the decision making system should choose that course of action that maximizes the expected utility of the communication. In one example aspect of the present invention, the recipient of the communication is considered as the principal agent since it is the recipient's attentional resources that are requested by the contactor. But the preferences of the contactor may also be considered in an attempt to maximize the utility of the communication to the contactor within the constraints imposed while maximizing the utility to the contactee. Further, in an automated setting, where the contactor is communicating with an automated contactee, the present invention can disregard the utility of the communication to the contactee and establish maximizing the utility of the communication to the contactor as the primary goal.

The optimal communication modalities may be based on factors including, but not limited to, available communication channels (including single versus multiple simultaneous channels), the tool used in an initial attempt to communicate, the contactee preferences, contactor preferences, specially identified time periods, groupings of contactors, contactee context, contactor context, contactee communication needs, contactor communication needs, contactor communication goals, schedules, priorities, deadlines, costs, benefits, contactee capabilities and contactor capabilities, for example.

By way of illustration, a speechwriter working on the state of the union address may have several communication modalities through which she can be contacted (e.g., in person, by phone, by email, by cooperatively editing the speech, by pager). Up to two weeks before the speech, when time is not so critical, the speechwriter may be willing to accept communications from persons in different categories via different types of communications modalities. For example, the speechwriter may prefer real-time communications (e.g., telephone, cooperative editing) from a first group of persons (e.g., President, White House staff, certain family members) with the type of real-time communication being based in part on where the speechwriter is located and what the speechwriter is doing. For example, the speechwriter may prefer a phone call when not working on the document, may prefer a phone call and a joint computer screen link for cooperative editing while working on the document and may prefer high priority email and/or mobile paging while at work but away from her desk. These preferences may be intended by the speechwriter to facilitate maximizing the utility of the communication to the speechwriter and/or to customize the work environment to the contactee's desires, for example. Similarly, the speechwriter may prefer non-real-time communications (e.g., low priority email) from a second group of persons (e.g., specific members of Congress, certain press, and certain close friends) so that her workflow is not interrupted, again attempting to maximize the utility of communications and customize the workplace.

In one example aspect of the present invention, when a contactor wishes to communicate with a contactee, the contactor may employ the present invention to identify communication modalities and present ranking information concerning the modalities based on maximizing the utility of the communication with the contactee. Such utility calculations may consider both current conditions and probabilities associated with future conditions. By way of illustration, if the President wants to contact the contactee concerning the speech, then substantially all methods of communication may be available to contact the contactee, and the method that will provide the most immediate feedback may be selected. For example, if the speechwriter is at her desk, working on the speech, then cooperative editing with a simultaneous voice channel and shared computer screen may be selected. But if the speech writer is in her car (as determined by GPS, for example), then although an immediate cellular phone call may maximize the immediacy of the communication, a phone call delayed for ten minutes until the speechwriter arrives home and has her laptop available for transcribing and/or editing may produce a higher utility. If the speech writer is outside cellular coverage, and has no satellite phone available, then a runner may be dispatched with the message. By way of further illustration, if the speech-writer's veterinarian wishes to contact the contactee a month in advance concerning a reminder about an optional office visit for a healthy pet, then low priority email and/or a low priority voice mail may be chosen to maximize utility. As the illustrations point out, there can be a large number of variables to evaluate in determining the communication that will maximize utility.

The rich set of data concerning the contactee and/or contactor can be employed by the present invention to facilitate determining the communication modality that will maximize the utility of the communication. Sometimes the present invention may reason concerning the optimal communication modality with complete data, but at other times, since the set of data is large and complex, the present invention may sometimes reason concerning the decision under uncertainty. For example, the decision-making system may only have a belief, represented as a probability distribution, concerning the likelihood that a contactee is in a certain attentional state. Such a belief may be computed dynamically as a function of information from sources including, but not limited to, the contactee's calendar, desktop activity, ambient acoustics in the contactee's location and video analysis of the contactee's gaze or local activity, for example. Inferred likelihoods about a contactee's attention, location, and other aspects of a contactee's context may be employed to drive dynamic decision making about communications, motivated by an attempt to select actions that maximize the contactee's expected utility. Thus, the present invention can determine the optimal communication modality given multiple observations about the contactee and/or contactor contexts.

The present invention facilitates using multiple decision-making methods, where the best method is selected in different situations. For example, one decision may be made using simple priority rules, another by a policy that takes as input key aspects of the contactee's preferences and the communication preferences of the contactee and/or contactor. In another case, a decision may be made employing decision-theoretic reasoning concerning the value of the communication given a consideration of the uncertainties about the context. In addition, the decisions can be made sensitive to dates and times, considering specific assertions about particular time horizons to guide communications. For example, a contactee may attach great importance to communications occurring before a point in time (e.g., a speech being delivered) but then may attach very low importance to such communications for the following month.

In another example aspect, the contactor may specify desired modalities and allow the present invention to maximize communication utility within the specified modalities.

Although contactors can choose an initial communication modality, the contactor can be referred (e.g., by a message, by automated routing), to the preferred modality. In one example aspect of the present invention, communication devices (e.g., phones, computer screens, faxes) can include a "BestCom" button that initiates optimizing communication modalities and which removes the need for the contactor to make decisions concerning modality and routing, with such decisions made by the present invention. Given the availability of such a service, a potential future contactee may request that the potential future contactor utilize the present invention to contact the contactee when attempting future contacts.

The present invention is not limited to communications between two parties or to a single communication channel between two parties. It is to be appreciated that multiple channels and/or multiple communicating parties can be treated as increased sets of alternatives that may complicate utility maximizing computations without changing the fundamental process of identifying and establishing one or more communication modalities based on the preferences, contexts and capabilities of the communicating parties.

Yet another aspect of the present invention considers the value of delaying the communication and rescheduling it for a later time via an automated system that scans calendars and inferred availability information—or via establishing private dialogs with each potential participant, for example. As an example, assume that a contactor attempts to contact a contactee in real-time and the contactee is in an important meeting. The best option (e.g., one that maximizes utility) may be to reschedule a real-time conversation when the contactee is predicted to be back from meeting, based on calendar information or statistics concerning the contactee's comings and goings that facilitate predicting the contactee's likely availability. One aspect of the present invention may consider the calendar of the contactor to arrange a mutually good time.

Another aspect of the present invention facilitates presenting information to contactors and/or contactees and engaging them in a dialog to facilitate scheduling a communication. The dialog may produce entity selection data concerning the communication, where such data can be employed to choose between possible communication modalities. Such interactions can similarly be employed to schedule group meetings where the cost of delay (e.g., estimated loss in value of the information being transmitted), the current attentional states of the contactor(s), the current attentional states of the contactee(s), the potential attentional states of the contactor(s), the potential attentional states of the contactee(s), the availability of other modalities, the current availability of contactee(s) and the potential availability of the contactee(s) are considered.

The present invention includes methods for predicting the likelihood of when contactee(s) may be available, where such likelihoods can be employed in scheduling group meetings where the utility of the group experience of the n participants, n being an integer, is maximized. For example, calendars for the n participants can be examined to infer times at which the participants are likely to be available to share in some common modalities (e.g., videoconferencing, collaborative editing). In other cases, there may be automated analysis about the best way to engage in a group meeting when a subset of participants will not have access to the same more ideal modality than the others. In such situations, a decision may be made to limit the methods (e.g., forego video links) so as to maintain an equivalent relationship among participants. Automated meeting request(s) can be constructed from such analysis.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION

Figure 1:
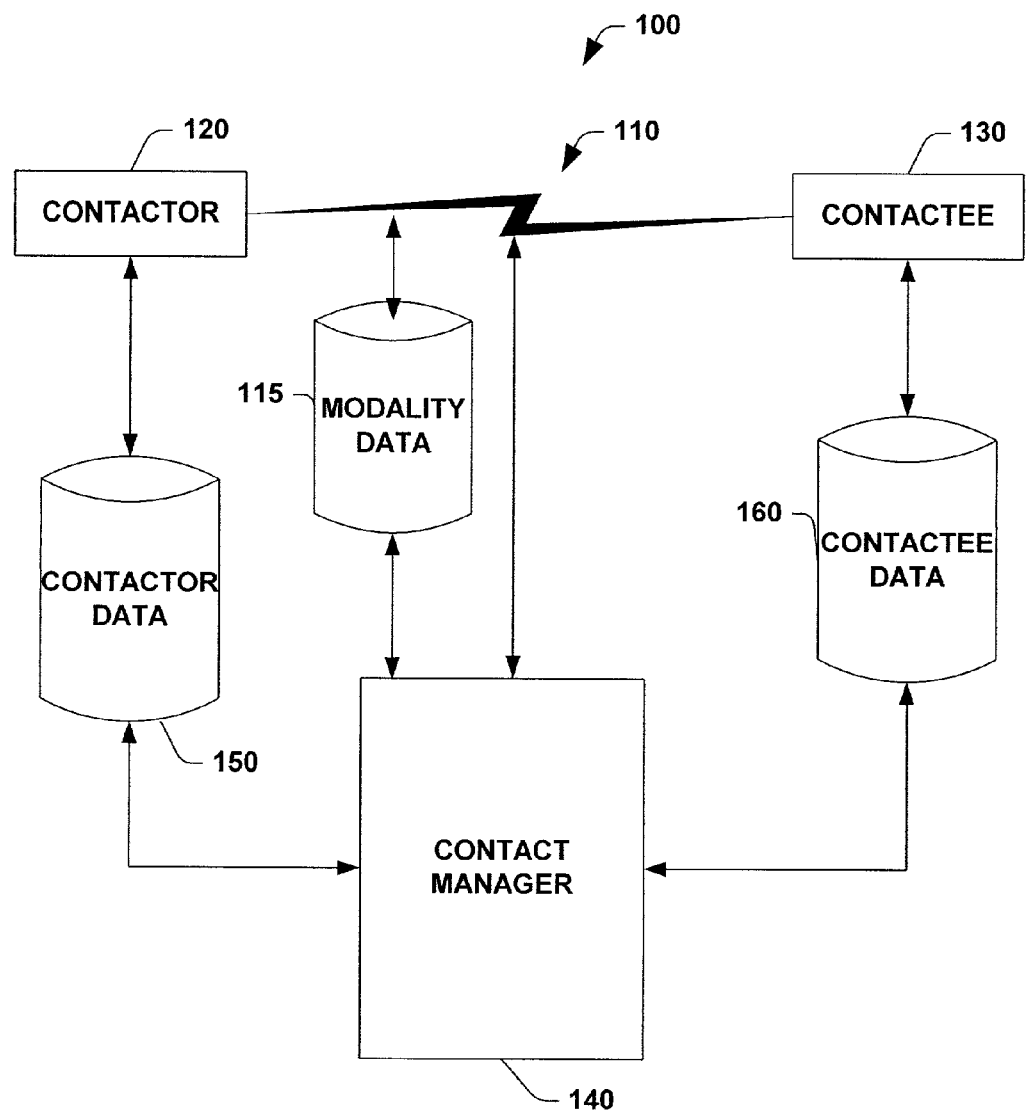
FIG. 1 is a schematic block diagram illustrating a system for identifying an optimal communication based on the preferences, capabilities, contexts and goals of the parties to engage in the communication, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details. In other instances, well-known structures and devices are shown in block diagram form in order to facilitate description of the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers.

It is to be appreciated that various aspects of the present invention may employ representations of deterministic policies specified as functions or rules that take as arguments contextual information, details about the nature of the participants, and the content or task at hand. The present invention may also employ technologies associated with facilitating inference and decision making under uncertainty and optimization of expected utility and/or minimization of expected costs. Thus, statistical inference may be performed with models constructed by hand, from data with machine learning methods, or by a mixture of machine learning and human assessment. Such models can be used in conjunction with deterministic policies where depending on the context, an inferential rule or deterministic rule is used. A variety of machine learning systems/methodologies (e.g., Bayesian learning methods that perform search over alternative dependency structures and apply a score (such as the Bayesian Information Criteria, etc.) methods, Bayesian classifiers and other statistical classifiers, including decision tree learning methods, support vector machines, linear and non-linear regression, and neural network representations, etc.) may be employed to build and update inferential models.

Referring initially to FIG. 1, a system 100 for identifying an optimal communication modality based on the preferences, context, capabilities and goals of the parties to engage in the communication is illustrated. The system 100 facilitates establishing a communication 110 between a contactor 120 and a contactee 130. While one contactor 120 and one contactee 130 are illustrated, it is to be appreciated that the system 100 may be employed to identify optimal communication modalities between two or more communicating parties. It is to be further appreciated that a party to the communication 110 may be a human or may be an electronic process.

The communication 110 may be achieved through a variety of modalities including, but not limited to, telephone modalities, computer modalities, hardcopy fax modalities, paging modalities and personal modalities, for example. Data concerning the modalities may be stored in a communication modality data store 115. The communication modality data store 115 can hold information including, but not limited to, modalities available, cost for communication using that modality, likelihood modality will become available, modality capacity and modality reliability, for example. The system 100 may consider modalities that are currently available to establish the communication 110 and may also consider predictions concerning modalities that may become available to establish the communication 110. For example, a computer may not be currently available, because it is turned off, but it may become available later, when the user of the computer arrives at work and turns it on. The telephone modalities can include, but are not limited to POTS telephony, cellular telephony, satellite telephony and Internet telephony. The computer modalities can include, but are not limited to email, collaborative editing, instant messaging, network meetings, calendaring and devices employed in home processing and/or networking. The personal modalities can include, but are not limited to videoconferencing, messengering and face-to-face meeting.

Data concerning a current modality (e.g., a phone that is busy) may be analyzed, as may data concerning the likelihood that the modality may become available (e.g., phone will no longer be busy). Identifying the optimal communication may, therefore, include considering the benefits of establishing the communication 110 at a first point in time, with the communication modalities available at that point in time, and considering the costs of delaying establishing the communication 110 to a second point in time when other communication modalities may be available.

A contact manager 140 is employed to identify and determine which modalities can be employed for the communication 110 between the contactor 120 and the contactee 130. To facilitate identifying the modalities and to further facilitate determining which of the modalities should be employed for the communication 110, and at what point in time the communication should be attempted, the contact manager 140 has access to a contactor data store 150, a contactee data store 160 and a modality data store 115. The contactor data store 150, the modality data store 115 and the contactee data store 160 can store data in data structures including, but not limited to one or more lists, arrays, tables, databases, stacks, heaps, linked lists and data cubes. The contactor data store 150, the modality data store 115 and the contactee data store 160 can reside on one physical device and/or may be distributed between two or more physical devices (e.g., disk drives, tape drives, memory units). Further, the contactor data store 150, the modality data store 115 and the contactee data store 160 may reside in one logical device and/or data structure. Similarly, the contact manager 140 can be distributed between two or more cooperating processes and/or reside in one physical or logical device (e.g., computer, process).

In one example of the present invention, the contactee data 160 is not made available to the contactor 120, while one or more portions of the contactor data 150 are made available to the contactee 130. Thus, the privacy of the contactee 130 may be protected and the identity of the contactor 120 may be revealed.

The contactor data 150 may include current state information, predictions concerning future states and costs associated with delaying a communication to points in time associated with the predictions concerning future states. Similarly, the contactee data 160 may include current state information, predictions concerning future states and costs associated with delaying a communication to points in time associated with the predictions concerning future states. For example, the contactee data 160 may include information concerning the current attentional status of the contactee 130 (e.g., in conversation on the phone concerning an assigned task) and may also include information concerning predicted attentional states of the contactee 130 at one or more future points in time (e.g., 25% likelihood contactee 130 in same state in five minutes, 50% likelihood contactee 130 in lower attentional state in ten minutes).

The contact manager 140 may therefore examine the communication modality data 115, the contactor data 150 and the contactee data 160 when performing processing associated with identifying the modality that will maximize the utility of the communication 110 between the contactor 120 and the contactee 130. While one communication 110 is illustrated, it is to be appreciated that one or more communication modalities may be employed in methods including, but not limited to, parallel, serial and simultaneous communication between the contactor 120 and the contactee 130. By way of illustration, the contactor 120 and the contactee 130 may communicate by telephone at the same time that they are sharing a document via collaborative editing over a computer network communication modality.

The contact manager 140 may examine data (e.g., contactor data 150, modality data 115, contactee data 160) and find information sufficient to perform deterministic calculations for identifying the optimal modality for the communication 110. The deterministic calculations may be facilitated by applying one or more preferences based rules based on the sufficient information. By way of illustration, if a first party is attempting to telephone a second party, then the present invention may display the current best possible means, ranked by likelihood, of reaching the second party for real-time telephony given the context of the second party. By way of further illustration, if a contactor listed in a contactee's people class store as a "critical colleague" tries to reach the contactee, and the contactee is not in a meeting, and it is business hours, and the contactee is near a voice-enabled device, and the contactor is using a voice-enabled device, the present invention may route that contactor to the best voice enabled device, unless the contactee is having a conversation with someone.

Tools for displaying and editing such preferences and/or rules would ease the task of creating and managing such rules. In a more sophisticated approach, the present invention directs communications via automated methods that identify communication actions that have the value or highest expected value given uncertainties in variables under consideration. Several formulations of decision problem are feasible, depending on the variables under consideration, the preferences being represented, and the principal agent (or "owner") of the decision.

In a general formulation of the problem, the present invention considers a "communications value function", $f$, that return a value for each communication modality or subset of modalities under consideration or an ordering over communication modalities in terms of acceptability of the modality or subset of modalities.

Value(Modality)
=$f$(preferences of contactee, preferences of contactor, preferences of organization, context of contactee, context of contactor)

where context of contactee and contactor include the devices that are available, the time of day, tasks and situation at hand for the contactor and contactee, and the like. It is to be appreciated that the context of the contactee and contactor may be stored in one or more formats, including, but not limited to, an XML schema.

In one example aspect, the present invention orders the modalities by assigned value and attempts to create a connection or to advise the contactor and/or contactee concerning the best possible connection.

But the contact manager 140 may discover that incomplete information is available. Thus, the contact manager 140 may be uncertain concerning certain data points involved in calculations for identifying the optimal modality for the communication 110. Thus, the contact manager 140 may be required to reason under this uncertainty. For example, in one example aspect of the present invention, the contact manager 140 may require a value associated with the attentional state of the contactee 130. However, for one sample calculation, no such value may be found in the contactee data 160. Thus, the contact manager 140 may rely on one or more conditional probabilities associated with the contactee 130 attentional status based on information like desktop events, ambient noise in the location of the contactee 130 and gaze tracking when determining the maximum utility.

In general, there may be uncertainty concerning preferences and one or more parameters employed to model a context. In this situation, a probability distribution over the different states of each variable can be inferred and expected values for each modality can be computed. For example, if there is uncertainty concerning aspects of the context of the contactee, the probability distribution (here represented abstractly), given evidence E observed about the context, and sum over the uncertainties can be represented:

Expected value(Modality)
=$\Sigma_i f$(preferences of contactee, preferences of contactor, preferences of organization, p(context i of contactee|E), context of contactor)

The present invention may order the modalities by assigned expected value and attempt to create a connection or to advise the contactor and/or contactee concerning the best connection.

Considering now more specific examples of the use of expected utility, a particular basic formulation of decision-making under uncertainty in the context of the preferences of the contactee 130 is captured by Equation 1.

$$A^* = \mathrm{argmax}_j \sum_i p(context^R i \mid E) \times u(A_j, A_k^C, C, context^R i, context^C) \quad (1)$$

where $A^*$ is the ideal communication actions, which include the modalities employed by the contactor ($A^{C*}$) and contactee (Recipient) ($A^{R*}$) computed by optimizing Equation 1. In the equation, $A_j$ is the communication modality being considered, $A^C_k$ is the communication modality employed by the contactor, $context^R_i$ is the context of the contactee (Recipient) of the intended communication, $context^C$ is the context of the contactor, and C is the identity of the contactor, typically linked to a class of person (e.g., critical associate, previously replied to, family, unknown). Thus, in an example aspect of the present invention, the conditional probability $p(context^R_i|E)$ that the contactee has a certain context given the evidence E is employed in conjunction with the utility function u to determine the ideal communication actions that can be taken to maximize the utility of the communication 110 between the contactor 120 and the contactee 130.

The basic formulation for identifying optimal communication modalities can be extended by introducing uncertainty about the context of the contactor 120, which adds the summing noted in equation 2 to the uncertainty calculations of equation 1. The particular communication action and/or modality selected for the initial contact by the contactor 120 is represented as $A^C_{init}$ $$A^* = \mathrm{argmax}_j \sum_i \sum_k p(context^R i \mid E) \quad (2)$$
$$p(context^C k \mid E) \times u(A_j, A^C_{init}, C, context^R i, context^C k)$$

The contactor 120 and contactee 130 contexts represent rich sets of deterministic or uncertain variables. The contexts may contain data, including but not limited to, the available modalities for the contactor 120 and/or contactee 130 (e.g., is a private voice channel available, are channel and rich desktop available, are television cameras available), information concerning the nature of the location, and content or task of the contactor 120 and of the contactee 130. Data associated with automated assessments and/or directly marked indications of urgency or importance in the communications may also be evaluated in identifying optimal communication modalities. The contextual variables can be treated as explicit deterministic or probabilistic factors in the optimization. For example, $m^c_k$ can represent the modalities available to the contactor 120 and thus equation 3 considers combinations of modalities available to the contactor 120.

$$A^* = \underset{l,n}{\operatorname{argmax}} \sum_i \sum_k p(context^R i \mid E) p(context^C k \mid E) \times \\ u(A(m_l^R, m_n^C), A_{init}^C, C, context^R i, context^C k)$$ (3)

Thus, the system 100 can, in various example aspects, account for the preferences, contexts and capabilities of the contactor 120 and/or the contactee 130 where information concerning the contexts may be incomplete, thus requiring reasoning under uncertainty to identify the likely optimal communication modality.

Figure 2:
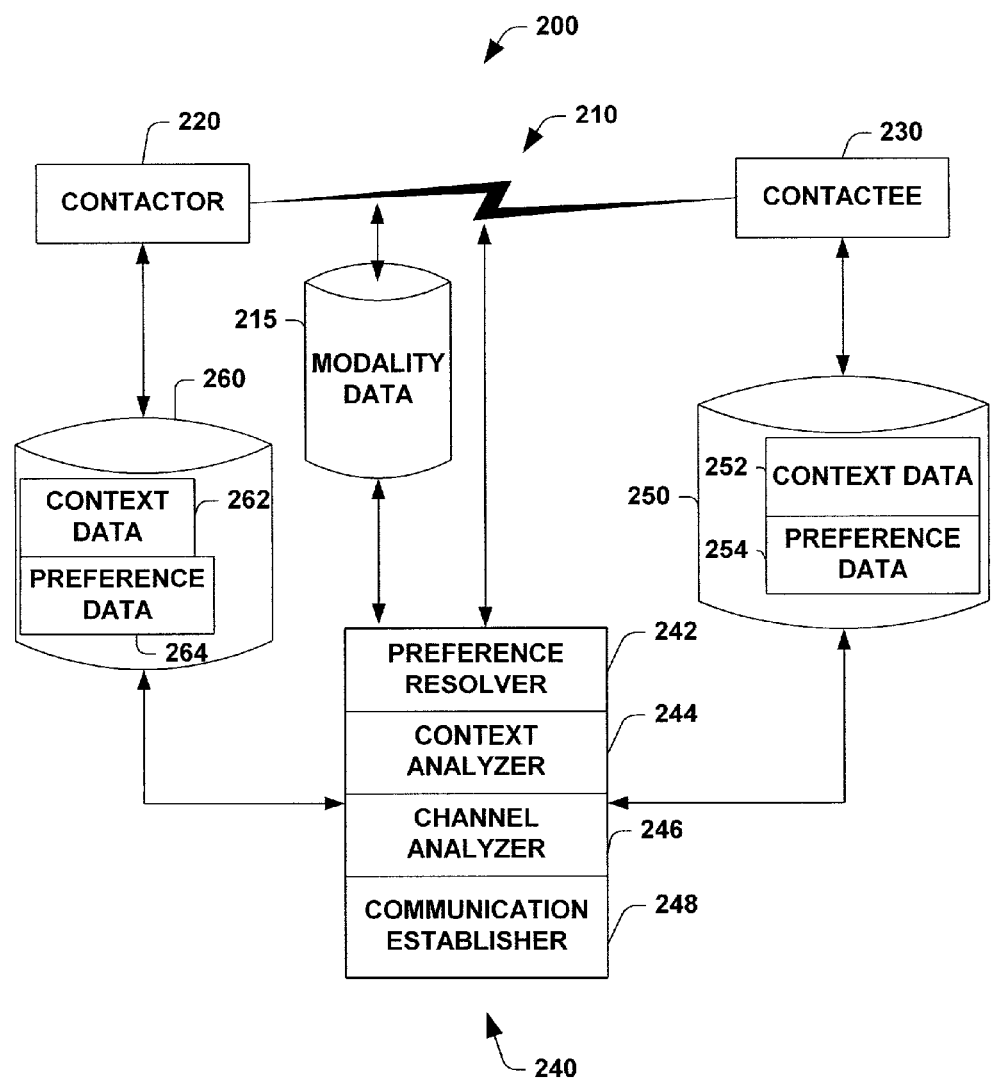
FIG. 2 is a schematic block diagram illustrating a system for identifying and establishing an optimal communication based on the preferences, capabilities, contexts and goals of the parties to engage in the communication, in accordance with an aspect of the present invention.

Referring now to FIG. 2, a system 200 for identifying and establishing optimal communications based on the preferences and context of the parties engaged in a communication 210 is illustrated. The communication 210 may occur between a contactor 220 and a contactee 230. While one communication 210 between one contactor 220 and one contactee 230 is illustrated, it is to be appreciated that a greater number of communications between a similar or greater number of contactors and/or contactees may be identified by the present invention. By way of illustration, communications 210 to facilitate group meetings may be identified by the system 200 as can multiple communications 210 between two communicating parties (e.g., duplicate messages sent simultaneously by email and pager).

The communication 210 that is identified by a communication manager 240 may depend, at least in part, on one or more sets of data concerning communication modalities, contactors and/or contactees, for example. One possible data set, a communication modality data set 215 concerns the available communication channels. The available communication channels can include, but are not limited to email (of various priorities), telephone (POTS, cellular, satellite, Internet), paging, runners/couriers, video conferencing, face-to-face meeting, instantaneous collaborative editing, delayed posting collaborative editing, picture in picture television, home device activation (e.g., turning on lights in the study, ringing the telephone with a distinctive pattern) and so on. A communication modality may not be a static entity, and thus information concerning the state, capacity, availability, cost etc., of the communication modalities can change. Thus, the communication modality data set 215 can contain current state information and/or data to facilitate making predictions concerning future state, capacity, availability, cost etc. associated with one or more communication modalities.

The location of the contactee 230 can determine which communication modalities, if any, are available. For example, a speechwriter may have collaborative editing, phone, email, pager, video conferencing and face-to-face communications available at her office in the White House, may have phone, face-to-face and email available while in her office at home, may only have satellite phone available while on vacation and may have no real-time capacity while in the shower or asleep. The current task of the contactee 230 can also determine which communication modalities, if any, are available. For example, if the speechwriter is currently on the phone, then the phone may not be available. Predictions concerning the likelihood that the phone will become available can be employed by the system 200 in determining the optimal modality for the communication 210. Thus, rather than sending an email at a first point in time (e.g., while the phone is busy), the present invention may schedule a real-time phone call at a second, later point in time, when it is likely that the speechwriter will be off the phone.

The communication manager 240 may also have available another set of data referred to as the contactee data 250. The contactee data 250 may include information related to hardware, software, contactee task being performed, contactee attention status, contactee context data 252 and contactee preference data 254, for example. By way of illustration, the hardware data may include information related to what hardware is available to the contactee, what hardware is being employed by the contactee (e.g., desktop, laptop, PDA), the capabilities of that hardware (e.g., enough memory and communication bandwidth for videoconferencing), the cost of employing that hardware and the state(s) in which that hardware is currently functioning (e.g., online, offline). The hardware data may also include information concerning usage patterns that facilitate determining the likelihood that an unavailable piece of hardware will become available. The software data may include information related to what software is available to the contactee, what software is currently being employed by the contactee (e.g., which word processor is being used to edit the speech), the capabilities of that software (e.g., allows collaborative editing) and the state(s) in which that software is currently functioning (e.g., running and active, running but inactive). The software data may also include information concerning usage patterns that facilitate determining the likelihood that an unavailable piece of software will become available.

The contactee data 250 may also contain preference data 254 concerning the preferences of the contactee 230. The preference data 254 can include data concerning how the contactee 250 prefers to be contacted, with those preferences varying over time with respect to various contactors 220 and various topics of communication. For example, the speechwriter may initially allow communications from a large group of persons concerning the State of the Union speech. The speechwriter may also establish preferences that allow the President to communicate with her with a best effort at real-time telephony at all times up to the deadline for the speech. But the speechwriter may gradually restrict the group of people from whom she is willing to accept real-time communications as the deadline approaches and she may further restrict the means by which such people can communicate. In the last hours before the deadline, the speechwriter may be closed to all real-time communications except in person communications with the President and telephone based emergency medical information concerning family members, for example.

The contactee preference data 254 can include data concerning, but not limited to, preferences concerning the time of day for communicating (e.g., early morning, business hours, evening, late night, sleeping hours), the time of the week for communicating (e.g., Monday through Friday, Weekend, Holiday, Vacation), identity of contactors (e.g., employer, employees, critical colleague, colleague, peers, nuclear family, extended family, close friends, friends, acquaintances, others), hardware currently available or available within a time horizon of a communication attempt (e.g., desktop, laptop, home computer), preferred software (e.g., email, word processing, calendaring) and preferred interruptability (e.g., do not interrupt while focused on work, only interrupt while not focused), for example. While six preferences are identified in the preceding sentence, it is to be appreciated that a greater or lesser number of preferences may employed in accordance with the present invention.

The contactee data 250 may also include a context data 252. The context data 252 is generally related to observations about the contactee 230. For example, observations concerning the type of activity in which the contactee 230 is involved (e.g., on task, not on task), location of the contactee 230 (e.g., office, home, car, shower), calendar (e.g., appointment status, appointment availability), history of communications with other party (e.g., have replied to email in the past, have spoken to on the telephone recently, the utility of the interaction, the duration of the interaction), background ambient noise at current location, number of hours at work that day and attentional status (e.g., high focus, focus, light focus, conversation with another person, light activity) may be stored in the context data 252. While seven observations are listed in the preceding sentence it is to be appreciated that a greater or lesser number of observations may be stored in the context data 252. On some occasions the context data 252 may be incomplete (e.g., video analysis data unavailable because video camera broken). Thus, the communication manager 240 may need to reason concerning the optimal communication while relying on such incomplete data. Thus, the contactee data 250 may also include information to facilitate producing one or more probabilities associated with a missing data element. By way of illustration, the contactee data 250 may contain information operable to predict the likelihood that the contactee 230 is in a high attentional state even though gaze tracking information is unavailable.

The contactee data 250 may further include information concerning the long-term and/or acute, dynamically changing communication needs of the contactee 250. By way of illustration, the contactee 250 may need to have no interruptions for the next hour (e.g., "hold everything unless high critical on this task or an hour from now"). By way of further illustration, to prevent a contactor 220 from "ducking" the contactee 230 by leaving an email or a voice mail when the contactee 230 desires to speak with the contactor 220, the contactee 230 may require that contacts from the contactor 220 be made in a certain way within X units of time of notification that the contactor 220 desires communication (e.g., if research assistant tasked with finding a crucial fact tries to contact speechwriter by email, speechwriter wants real-time phone conversation within ten seconds of assistant's attempt).

Thus, returning to equation 1, $$A^* = \underset{j}{\operatorname{argmax}} \sum_i p(context^R i \mid E) \times u(A_j, A_k^C, C, context^R i, context^C) \quad (1)$$

the contactee data 250 is seen to contribute to the utility function u through the $context^R_i$ component, which can include the contactee context data 252 discussed above.

In addition to the contactee data 250 employed in determining the optimal communication, data concerning the contactor 220 may also be employed. The contactor data 260 may include hardware, software, context, preference and communication needs data similar to that available for the contactee 230, but different in that it is prepared from the point of view of the contactor 220.

Thus, returning again to equation 1, $$A^* = \underset{j}{\operatorname{argmax}} \sum_i p(context^R i \mid E) \times u(A_j, A_k^C, C, context^R i, context^C) \quad (1)$$

the contactor data 260 is seen to contribute to the utility function u through the $context^C$ component, which can include the contactor context data 262 discussed above.

The present invention is not limited to communications between two parties or to a single communication channel between two parties. It is to be appreciated that multiple channels and/or multiple communicating parties can be treated as increased sets of alternatives that may complicate utility maximizing computations without changing the fundamental process of identifying and establishing one or more communication modalities based on the preferences, contexts and capabilities of the communicating parties.

The communication manager 240 may include several components responsible for performing portions of the functionality of the communication manager 240. For example, the communication manager may include a preference resolver 242. The preference resolver 242 can examine the contactee preference data 254 and the contactor preference data 264 to find correlations between the two sets of data. For group communications, the preference resolver 242 may examine multiple sets of preference data to find correlations between the preferences. By way of illustration, for a communication between two parties, the preference resolver 242 may determine that both parties would prefer to communicate by high priority email for communications associated with a first task. Similarly, the preference resolver 242 may determine that the contactee 230 would prefer to communicate by collaborative editing and phone for communications concerning a particular document, while the contactor 220 would prefer to communicate only by telephone. Thus, the preference resolver 242 may produce data or initiate processing that assigns values to the correlations between the contactee 230 preferences and the contactor preferences 220. In one example aspect of the present invention, the preferences of the contactee 230 are given more weight, and thus, if the contactor 220 attempted a phone conversation concerning the document for which the contactee 230 preferred both phone and collaborative editing, then the preference resolver 242 may produce data or initiate processing that would make it more likely that the contactor 220 would communicate by both phone and collaborative editing. In another example aspect of the present invention, the preferences of the contactor 220 are given priority over the preferences of the contactee. By way of illustration, when a human contactor 220 is attempting to communicate with an electronic contactee 230, the preferences of the contactor 220 may be considered more important, and thus the preference resolver 242 may produce values or initiate processing that makes it more likely that the preferences of the contactor 220 are observed. In another example aspect of the present invention, the preference resolver 242 may produce a list of potential communication modalities ranked on their responsiveness to the preferences.

The communication manager 240 may also include a context analyzer 244. The context analyzer 244 can examine the contactee context data 252 and the contactor context data 262 to find correlations between the two sets of data. For group communications, the context analyzer 244 may examine multiple sets of context data to extract information concerning the contexts. By way of illustration, for a communication between two parties, the context analyzer 244 may determine that the contactee context is such that real-time communications are not immediately available but there is an $X_1$% likelihood that such communications will be available at a point of time $T_1$ in the future, and an $X_2$% likelihood that such communications will be available at a point of time $T_2$ in the future. Further, the context analyzer 244 may determine that although the contactor 220 has requested real-time telephony that the context of the contactor 220 is such that email communication may optimize utility. For example, the context of the contactor 220 may include information concerning the ambient noise at the location of the contactor 220. The context analyzer 244 may determine that the noise level is not conducive to optimizing utility by real-time telephony and thus may produce values and/or initiate processing that will make it more likely that the contactor 220 will communicate with the contactee 230 via email. Similar to processing performed by the preference resolver 242, the context analyzer may, in different examples of the system 200, weight the context of the contactee 230 more than the context of the contactor 220 or vice versa.

Returning again to equation 1, $$A^* = \underset{j}{\operatorname{argmax}} \sum_i p(\mathit{context}^R i | E) \times u(A_j, A_k^C, C, \mathit{context}^R i, \mathit{context}^C) \quad (1)$$

in one example of the present invention, the context analyzer 244 can be viewed as performing processing associated with the utility function u and its analysis of the $\mathit{context}^R_i$ and the $\mathit{context}^C$.

The communication manager 240 may also include a channel analyzer 246. The channel analyzer 246 can be employed to analyze the communication modality data set 215, for example. The channel analyzer 246 can produce data concerning the current availability of a communication modality and/or the likelihood of the modality becoming available. The channel analyzer 246 may examine one or more channels that the contactor 220 specified for the communication, and/or one or more channels that the contactee 230 listed as preferences in the contactee preference data 254, for example. Further, the channel analyzer 246 may examine currently available channels as determined by location information associated with the contactee 230 and channels that may become available based on the activity of the contactee 230. For example, if the contactee 230 is currently driving home (as determined by GPS and schedule, for example), then the channel analyzer 246 may examine current cellular modalities and may additionally examine the modalities available at the home of the contactee 210. Thus, the channel analyzer 246 facilitates producing data and/or initiating processing that make it more likely that a desired channel will be employed when determining the optimal communication channel(s) for the communication 210 between the contactor 220 and the contactee 230. Thus, examining equation 1, $$A^* = \underset{j}{\operatorname{argmax}} \sum_i p(\mathit{context}^R i | E) \times u(A_j, A_k^C, C, \mathit{context}^R i, \mathit{context}^C) \quad (1)$$

in one example of the present invention, the channel analyzer 246 can be viewed as performing processing associated with the utility function u and its analysis of the contactor modalities $A_j$ and the contactee modalities $A^C_k$.

The communication manager 240 may also include a communication establisher 248. Once the ideal communication actions A* have been identified, the communication establisher 248 may undertake processing to connect the contactor 220 and the contactee 230 through the identified optimal communication modality. For example, if the optimal communication 210 is identified as being email, then the communication establisher may initiate an email composing process for the contactor 220 (e.g., email screen on computer, voice to email converter on cell phone, email composer on two-way digital pager), and forward the composed email to the most appropriate email application for the contactee 230 based on the identified optimal communication 210. For example, the communication establisher 240 may forward the email to the pager of the contactee 230 based on GPS data associated with the location of the contactee 230. In an alternative embodiment of the present invention, the system 200 does not include a communication establisher 248, relying instead on contactor 220 and/or contactee 230 actions, for example, to establish the communication.

It is to be appreciated that the preference resolver 242, the context analyzer 244, the channel analyzer 246 and the communication establisher 248 may be implemented alone or in combinations of hardware, software and/or firmware. It is to be further appreciated that the preference resolver 242, the context analyzer 244, the channel analyzer 246 and the communication establisher 248 may employ one or more threads and/or processes executing alone and/or co-operating. Further, such threads and/or processes may reside on one processor and/or may be distributed over two or more processors. In one example of the present invention, the preference resolver 242, the context analyzer 244, the channel analyzer 246 and the communication establisher 248 are separate processes employing one or more threads, with each of the separate processes residing in one processor.

Figure 3:
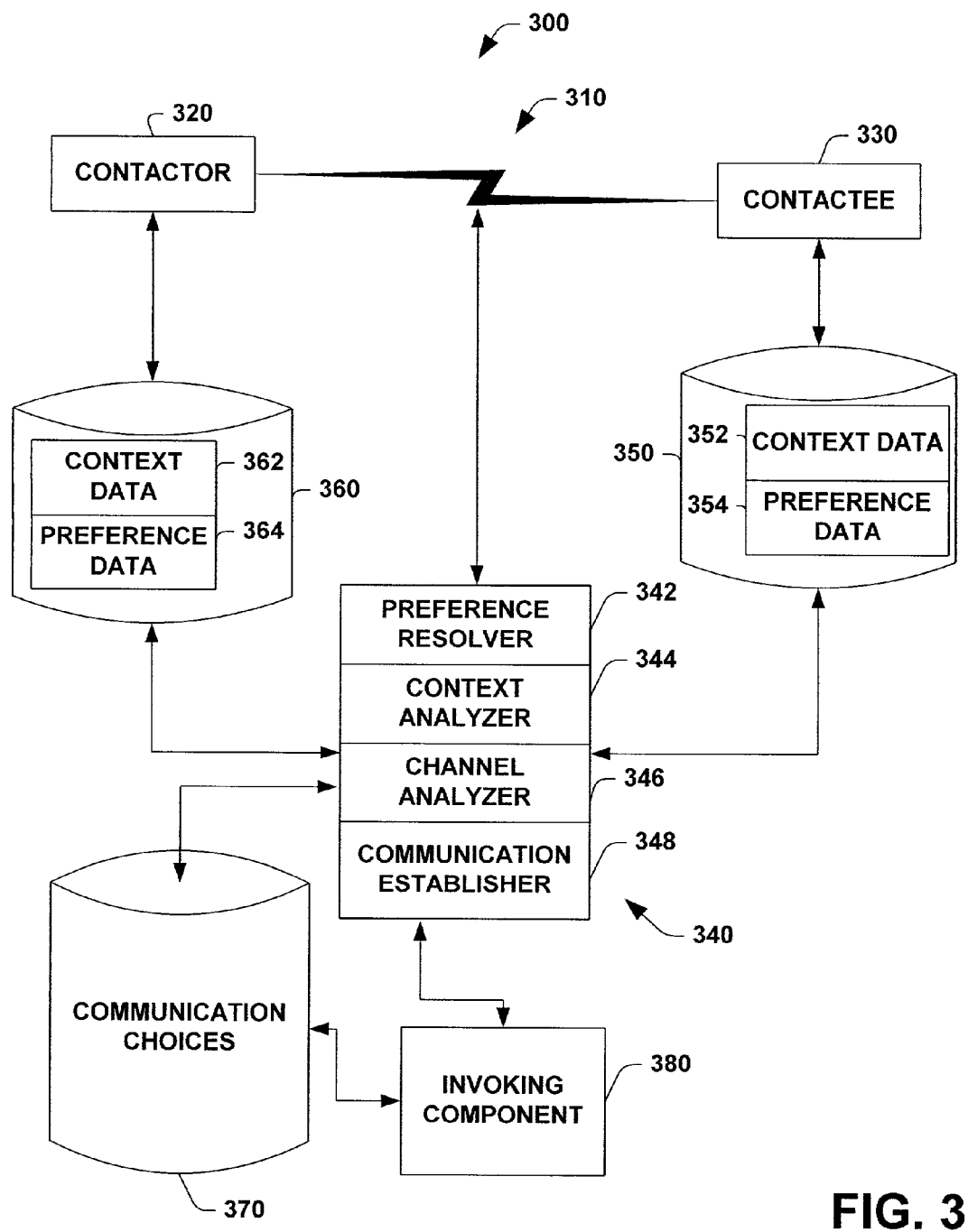
FIG. 3 is a schematic block diagram further illustrating a system for identifying and establishing an optimal communication based on the preferences, capabilities, contexts and goals of the parties to engage in the communication, in accordance with an aspect of the present invention.

FIG. 3 illustrates a system 300 for identifying and establishing an optimal communication based on the preferences, capabilities and contexts of the parties to engage in the communication, wherein components previously described with respect to FIG. 2 are identified in FIG. 3 by similar reference numbers which have been increased by adding 100. The system 300 includes a communication choices data store 370 and an invoking component 380. The communication choices data store 370 can store data in data structures including, but not limited to one or more lists, arrays, tables, databases, stacks, heaps, linked lists and data cubes. The communication choices data store 370 can reside on one logical and/or physical device and/or may be distributed between two or more logical and/or physical devices (e.g., disk drives, tape drives, memory units). The communication choices data store 370 can store information produced and/or retrieved, for example, by the communication manager 340 concerning potential modalities that can be employed to facilitate the communication 310. For example, the communication choices data store 370 can hold lists of communication modality rankings that can be presented to the contactor 320 and/or contactee 330, which will then allow the communicating parties to enter into a dialog with the system 300 and/or each other to decide which of the available choices they would prefer for this particular communication. The dialog may produce entity selection data concerning the communication, where such data can be employed to choose between possible communication modalities. Similarly, the communication choices data store 370 can hold lists of communication modality rankings that can be presented to the invoking component 380. The invoking component 380 may then attempt to establish the identified communications. Due to race conditions, for example, the invoking component 380 may attempt to establish a communication that is no longer possible (e.g., phone was available then becomes unavailable), and thus, the invoking component 380 may work through the list available in the communication choices data store 370 until a communication is established.

The invoking component 380 may perform actions including, but not limited to, scheduling, calendaring and/or initiating a communication. By way of illustration, the invoking component 380 may determine, based at least in part on data stored in the communication choices data store 370, that a real-time communication should be performed in ten minutes. Thus, rather than immediately initiate the communication, the invoking component 380 may schedule the communication and may inform the parties who are going to communicate that the communication has been scheduled. By way of further illustration, the invoking component 380 may determine that a video-conference between four parties should be performed and by examining the calendars of the four individuals, the invoking component 380 may determine that the video conference should occur at four o'clock in the afternoon on May $1^{st}$. Thus, the invoking component 380 may update the calendars of the parties, arrange for the video-conference, and inform the parties of the plans. By way of still further illustration, the invoking component 380 may determine that both parties are immediately available for the real-time communication and may dial the phones on both ends to establish the communication.

Figure 4:
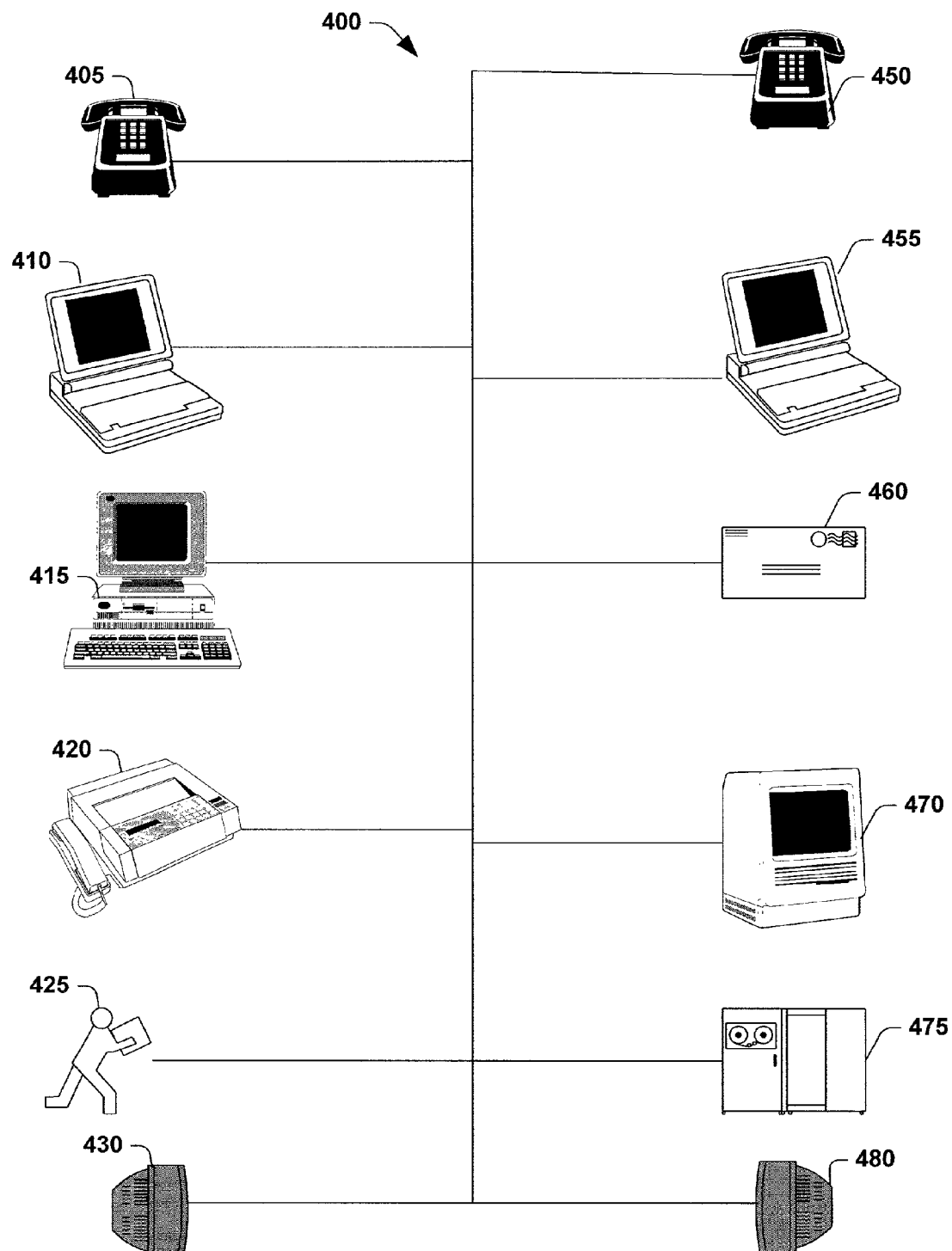
FIG. 4 illustrates an environment in which the present invention may be employed.

FIG. 4 illustrates an environment 400 in which the present invention may be employed. The environment 400 may include a plurality of communication devices, some of which are available to one or more contactors and some of which are available to one or more contactees. For example, the left side of FIG. 4 may represent communication devices associated with a contactor and the right side of FIG. 4 may represent communication devices associated with a contactee. The contactor may have, for example, a phone 405, a laptop 410, a desktop system 415, a fax 420, a courier 425 and a home television 430 available at different times and at different locations. The contactee may have, for example, a phone 450, a laptop 455, a regular mail reader 460, a minicomputer system 470, a mainframe system 475 and a home television 480 available at different times and at different locations.

The contactee may have established preferences that indicate that for communications from a first group of contactors (e.g., traveling salesmen employees of the contactee) the contactee would prefer email, and if the contactor does not have email capability, then the contactee would prefer regular mail, and would only prefer a real-time communication if no other modality was available and the communication was high critical. Similarly, the contactee may have established preferences that indicate that for communications from a second group of contactors (e.g., nuclear family, close friends) the contactee would prefer real-time phone communications concerning a first group of topics (e.g., work-related, emergency medical information related), and would prefer an email concerning other groups of topics. By way of further illustration, the contactee may have established preferences that indicate that for communications from a third group of contactors (e.g., collaborating authors) that the contactee would prefer both a real-time phone call and a shared computer screen displaying the document at a point concerning which the contactor wishes to communicate.

Given this set of preferences, communications attempted from a contactor may take a different form than the contactor would prefer. But since the attention of the contactee is the resource that is being accessed, for certain groups that resource will be sparely provided, while for other groups it will be generously provided, depending on the preferences of the contactee and the identity of the contactor.

The preferences of the contactee are not the only data points that are evaluated by the present invention when identifying the optimal communication modality for establishing a communication between the contactor and the contactee. For example, although the contactee may prefer an email or a regular piece of mail from a traveling salesman concerning a contract the salesman has written (e.g., for documentary purposes), the salesman may not have a computer operable to send email and may not have time to send a regular piece of mail. Thus, the salesman who desires to contact the contactee may be informed by the present invention, after it analyzes the preferences and the capabilities of the parties, to send a fax using the fax machine 420. The present invention may then route the fax to the regular mail reading component 460 that can produce a communication close to what the contactee desired, thereby maximizing the utility of the communication while taking into account both the preferences and capabilities of the parties.

The preferences of the contactee may depend on where the contactee is located. Similarly, the capabilities of the contactee may depend on where the contactee is located. By way of illustration, at the office, the contactee may have a phone 450, the minicomputer 470 and the mainframe system 470 available. But at home the contactee may have only a phone 450, a laptop 455 and a television 480. Furthermore, while on the road, the contactee may have only the laptop 455. Thus, the present invention is able to examine the context of the contactee, which includes the location of the contactee, to determine capabilities. Even within a location, the capabilities of the contactee can vary from time to time. For example, at certain times during the day at work, the ambient noise level may be so high that real-time communications are impractical, and little, if any information could be communicated (e.g., while a particularly noisy piece of equipment is running near the telephone of the contactee). Thus, if a contactor attempts to contact the contactee employing real-time telephony, the present invention may schedule the phone call for a few minutes after the noisy equipment typically spins down, or may take a voice mail that is converted to email and displayed on the contactee's pager, for example. In this way, the present invention seeks to maximize the utility of the communication given the contactee's preferences and the contactee's capabilities, as those preferences and capabilities are affected by the dynamic environment in which the contactee exists.

The television 430 and the television 480 are examples of home devices that may be employed by the present invention to maximize the utility of a communication. For example, if the contactee's security company is trying to alert the contactee to an important piece of information (e.g., a theft in progress at the plant), and the contactee is at home watching a movie, then the present invention facilitates the contactor reaching the contactee by real-time phone communication and simultaneous video streamed to the contactee's television. Thus, the utility of the communication may be maximized as the contactee may be able to identify the thief or inform the security company that the apparent break-in is really a scheduled late-night pick-up.

Thus, it is to be appreciated that devices (e.g., televisions, telephones, heating systems, air filtration systems, etc.) may employ the present invention. By way of illustration, the contactor may be the local electric company computer, and the contactee may be a factory heating and air filtration system. The contactor may seek to inform the heating and filtration system, by the best means possible, that a rolling brownout is going to impact the plant in approximately thirty minutes. Thus, the present invention may attempt, based on the preferences and capabilities of the heating and filtration system and the preferences and capabilities of the electric company computer to communicate information concerning the length, duration and severity of the impending brownout. Thus, the factory may be able to act proactively, rather than reactively, to the brownout. This example is intended to illustrate that the present invention may be employed between computer processes. If the present invention informs the electric company computer that no communication is possible with the plant heating and filtration system, but that communication with the plant manager is possible via real-time telephony, then the electric company computer may place such a call. This escalation example is intended to illustrate that the present invention may be employed between computer processes and humans.

One example aspect of the present invention provides initiating means (e.g., button, icon, voice command) that can be employed to initiate identifying and establishing communications. The initiating means may, for example, be a button labeled BestCom, an icon with a star surrounding a data communication link or a voice command "Best Com Please". When the initiating means are employed, the context of the contactor is considered to be deterministic, and the context of the contactee is considered to be uncertain. Such may be the case where there is a relatively small amount of deterministic information available from the contactor, but rich, sensed context information available for the contactee. By way of illustration, the laptop 410 may include an icon that signifies that the contactor desires the attempted communication to employ the present invention. Thus, in this example of the present invention, the context of the contactor would be considered deterministic and the context of the contactee would be considered uncertain, triggering processing associated with reasoning under uncertainty.

FIG. 4 presents several communication devices that may be employed in establishing an optimal communication between a contactor and a contactee. For example, the present invention may determine that a real-time telephony communication between the contactor employing telephone 405 and the contactee employing telephone 450 may optimize the utility of the communication between the parties. But communicating through the telephones may not be possible at the moment that the contactor desires to make contact. Thus, the present invention can also consider the likelihood of obtaining access to a modality within a time frame t, where the likelihood that modalities could be made available by time t is represented by $p(m^c{}_k(t)|E)$. Another aspect of the present invention includes considering the costs to the contactor and/or contactee of arranging to access modalities that might not be available immediately. Thus, the opportunity to establish a communication with a first expected utility that is available immediately may be foregone for the opportunity to establish a communication with a second, higher expected utility at a later point in time.

Figure 5:
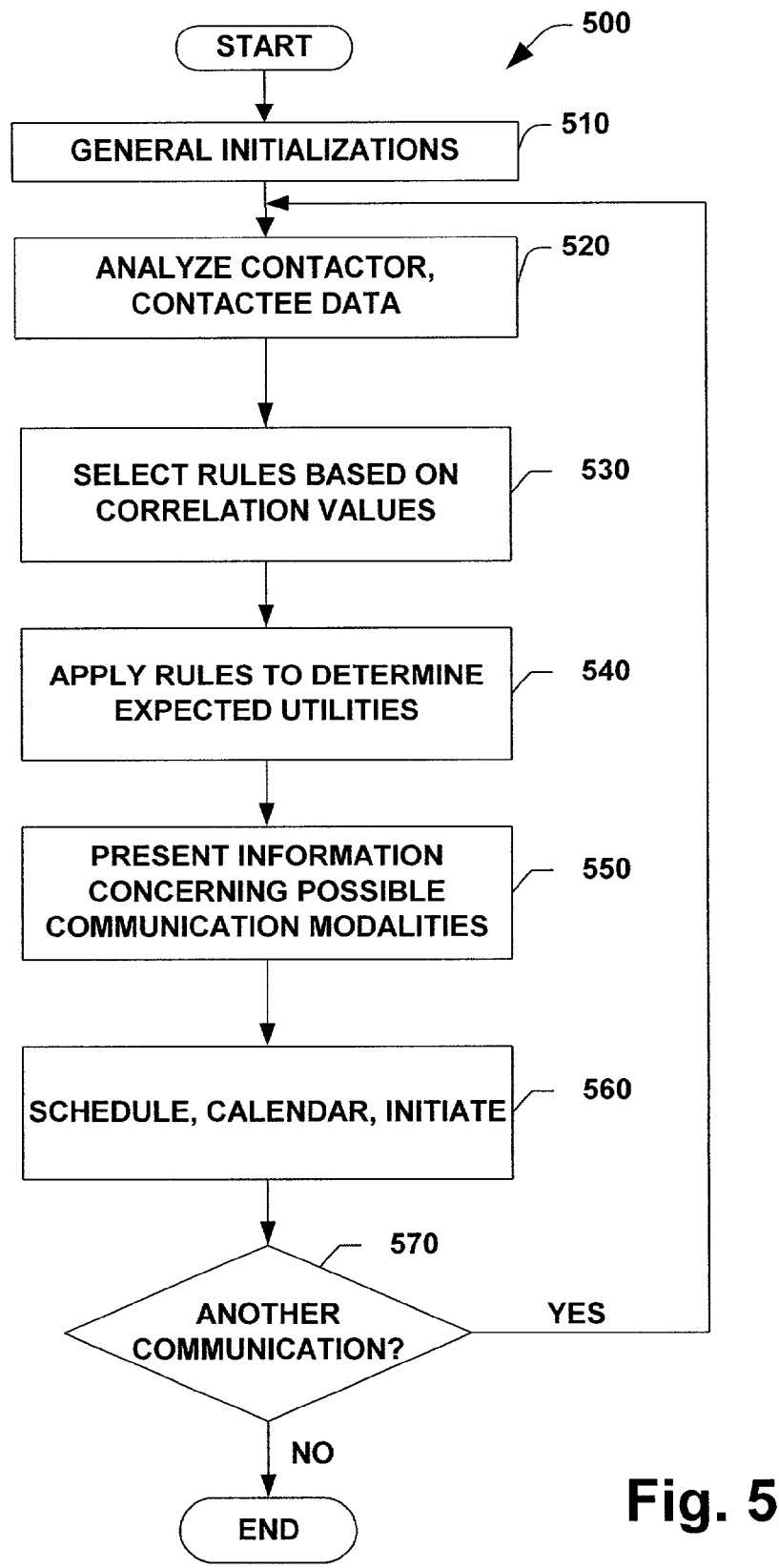
FIG. 5 is a flow chart illustrating one particular methodology for carrying out an aspect of the present invention.
Figure 6:
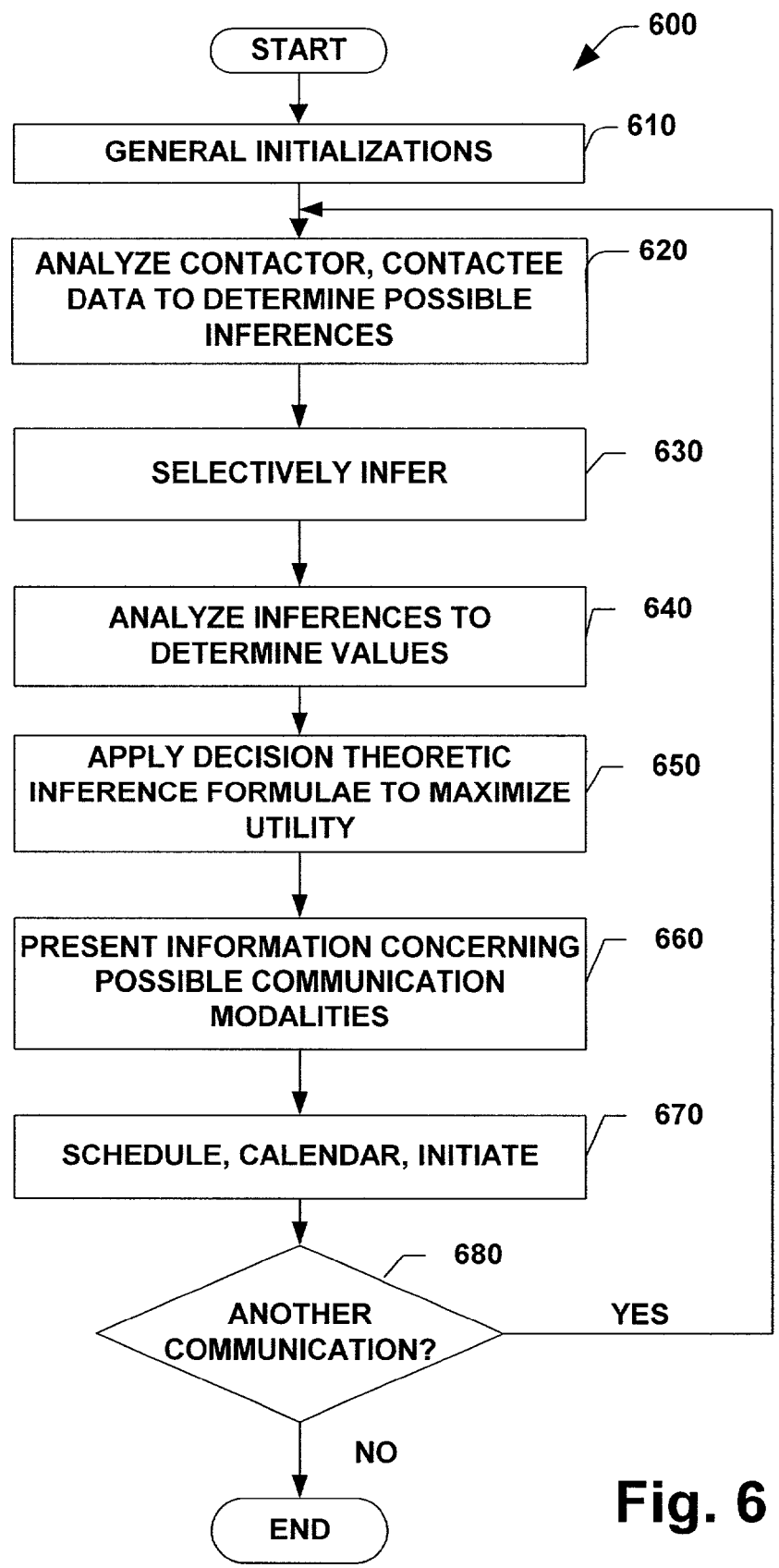
FIG. 6 is a flow chart illustrating another methodology for carrying out an aspect of the present invention.

In view of the exemplary systems shown and described above, methodologies, which may be implemented in accordance with the present invention will be better appreciated with reference to the flow diagrams of FIGS. 5 and 6. While for purposes of simplicity of explanation, the illustrated methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention. Further, additional and/or alternative methodologies may employ additional blocks, not illustrated herein.

Turning now to FIG. 5, a flow chart illustrates a method 500 for identifying and establishing an optimal communication modality between two or more communicating parties. The method 500 addresses determining maximum utility for a communication in a deterministic situation. At 510, general initializations occur. Such initializations can include, but are not limited to, allocating memory, establishing pointers, establishing data communications, acquiring resources, setting variables and displaying process activity.

At 520, data including, but not limited to, contactor data, contactee data and communication modality data is analyzed. The contactor data can include, but is not limited to, situation data and contactor preference data. The situation data can include observed data, for example, data gathered by watching the contactor and or observing the contactor's environment. For example, ambient noise levels may be analyzed to determine whether voice communications are practical. The contactor situation data can include, but is not limited to contactor application data (e.g., which applications are being employed), contactor user data (e.g., who is using the application) and contactor capability data. The contactor preference data refers to how the contactor would like the communication to be achieved. The contactor preference data includes, but is not limited to time data, location data, task data, goal data and communication needs data. In addition to the contactor and contactee preference data, there may be organization preference data. For example, when both a contactor and contactee belong to the same organization, then the contactor preferences and the contactor preferences may be blended together in accordance with organization policies. The communication needs data may, for example, include information that the contactor must contact the specified contactee within a specified period of time (e.g., investor must reach broker before the stock market closes). The contactee data includes, but is not limited to contactee situation data and contactee preference data. The contactee situation data can include but is not limited to contactee application data, contactee user data and contactee capability data. The contactee preference data includes but is not limited to time data, location data, task data, goal data and communication needs data.

The contactor data, the contactee data and the modality data may include information describing current conditions and information that facilitates predicting future conditions. For example, a phone may currently be in use, but data concerning phone usage patterns may be analyzed to facilitate determining the likelihood that that phone will be available at a point of time in the future.

The analysis of 520 can model utilities that consider the relationships between contactor and contactee preferences. For example, if both parties prefer real-time telephone communications, then there may be a high utility to arranging real-time telephony, but if one party prefers email and another party prefers video-conferencing, then real-time communications may not be preferred. In addition to blending the contactor preference data with the contactee preference data, there may be blending with organization preference data. For example, when both a contactor and contactee belong to the same organization, then the contactor preferences and the contactor preferences may be blended together in accordance with organization policies. The best communication actions may also be influenced by the capabilities of communication devices available at the time the communication is attempted and/or at some future time by the contactor and contactee. For example, if the contactor has video conferencing equipment available and the contactee similarly has video conferencing equipment available, then video conferencing may receive a high value in the analysis of preferences. But if the contactor has email capability, and the contactee has only regular mail capability, then video conferencing may be untenable even if it would have been the most desirable feature. In such a case, if the cost (e.g., delay time, effort, and/or dollars) of one of the participants finding a video conferencing facility is lower than the cost of moving to the next best modality, then it may be optimal to delay the communication until the initially deficient participant locates and executes communication with tools allowing for such rich communication.

At 530, one or more rules may be selected from a set of possible rules, where the rules can be employed to determine expected utilities. For example, given a large set of communication modalities and/or preferences, a first set of rules may be selected but given a small set of communication modalities and/or preferences, a second set of rules may be selected. The rules may be selected on other parameters including, but not limited to, the number of matching preferences, the number of matching capabilities, the nature and quality of the contexts, the type and number of communications requested and the time critical nature of the desired communication. The rules may have been specified by the contactee, for example. By way of illustration, contactees can specify groups of people and attributes concerning the nature of the contact and rules for communicating given the context (e.g., time, task, goals, location, contactor).

At 540, the rules selected at 530 are employed to determine one or more expected utilities for the candidate communication modalities. By determining a set of expected utilities, that include both immediately available modalities and modalities predicted to be available at a point of time in the future, the present invention facilitates optimizing the utility of the communication, thus providing improvements over conventional systems.

At 550, information concerning the possible communication modalities and their expected utilities can be presented to a contactor and/or contactee. Thus, the contactor and/or contactee can select from the possible communications that are identified as maximizing the utility of the communication. For example, a contactor may want to place a real-time telephone call, but may be presented with a list of other communication modalities that may produce higher utilities (e.g., high priority page to a person in a meeting where there is no telephone, real-time telephone call to contactee's assistant). Similarly, the contactee may be informed that the contactor is trying to contact them, and the contactee may be given the opportunity to override their preferences based on their current capabilities. By way of illustration, the contactee may be at home watching a movie at two a.m. when the preferences indicate that no real-time phone communications are desired. Since the present invention determined that the contactee was immediately reachable, the contactee may be presented, on the television, with a list of options for being contacted by the contactor (e.g., phone call, email, streaming video) and may be given the opportunity to override the preferences (e.g., willing to accept a phone call from the police department).

At 560, once the optimal communication modality or modalities have been identified, by the method and/or by the contactor and/or contactee, then the communication can be scheduled, calendared and/or initiated. By way of illustration, a real-time phone call, with both parties immediately capable and available can be initiated by ringing the phones, a collaborative editing session, with simultaneous instant messaging and cell phone communication may be scheduled for later in the day with email reminders sent to both parties and a video conference may be calendared for May $1^{st}$ at four o'clock in the afternoon, with calendar updates made for all invited parties.

At 570 a determination is made concerning whether another communication is desired. If the determination at 570 is no, then processing concludes, otherwise processing continues at 520.

The method 500 is not limited to one on one communications. Groups may be linked together using method 500 by analyzing data (e.g., hardware, software, context, preferences) of more than two communicators. By way of illustration, one or more participants may attempt to establish a communication between six people. The method 500 may determine that four people are ready, willing and able to communicate via a videoconference, while two others may only communicate with email (one due to preferences and one due to lack of a video camera). The method 500 may, therefore, alert the user with the email preference concerning overriding the preferences for this particular real-time communication, and may connect the person without a camera by voice only, while alerting the camera enabled group that this member cannot see them and can only hear them.

Turning now to FIG. 6, a flow chart illustrates a method 600 for identifying and establishing an optimal communication between two or more communicating parties. The method 600 addresses reasoning under uncertainty concerning one or more data points employed in determining a maximum utility for a communication. At 610, general initializations occur. Such initializations can include, but are not limited to, allocating memory, establishing pointers, establishing data communications, acquiring resources, setting variables and displaying process activity.

At 620, data including, but not limited to, contactor data, contactee data and communication modality data is analyzed to determine correlations that can be made and inferences that need to be made. The contactor data, which may be incomplete, can include, but is not limited to, situation data and contactor preference data. The situation data, which can also be incomplete, can include data gathered by watching the contactor and or observing the contactor's environment. For example, light levels may be analyzed to determine whether textual communications are practical. But there may be gaps in the contactor situation data. For example, information concerning the light level of the contactor may not be available, and thus inferences concerning such light may be required to be made from data like the location of the contactor (e.g., in a darkroom, in a truck) and the time of day (e.g., during daylight hours, late at night).

The contactee data, which may similarly be incomplete, includes, but is not limited to contactee situation data and contactee preference data. The contactee situation data, which is analogous to the contactor situation data, except that it is gathered from the point of view of the contactee, can similarly be incomplete and may include, but is not limited to contactee application data, contactee user data and contactee capability data. By way of illustration, data concerning the contactee's attentional state may be observed by monitoring data like gaze tracking data and desktop events (e.g., keyboard strikes, mouse movements). Such observed data may be combined to produce a likelihood that the contactee is in a certain attentional state (e.g., focused, not focused). Such a likelihood may then be combined with information concerning the assignment of the contactee and the current task being performed by the contactee to determine a value associated with the interruptability of the contactee. By way of illustration, if the contactee is focused on a task that is related to the contactee's assignment, then the contactee interruptability value may be very low while if the contactee is not focused and is not performing a task related to the contactee's assignment, then the contactee interruptability value may be very high. Calculating such an interruptability parameter may be a step in determining the optimal communication modality. But if a piece of data employed in calculating such interruptability is missing, then the present invention may make inferences concerning the missing data point so that likely optimal communications can be calculated.

The contactor data, the contactee data and the modality data may include information describing current conditions and information that facilitates predicting future conditions. For example, a phone may currently be in use, but data concerning phone usage patterns may be analyzed to facilitate determining the likelihood that that phone will be available at a point of time in the future.

Thus, at 630, selected inferences may be made. For example, $p(context^R_i|E)$ may be inferred to produce the conditional probability that a recipient (contactee) has a given context given certain evidence E. Similarly, an inference concerning the likelihood of obtaining access to a modality within a time frame t, where the likelihood that modalities could be made available by t time is represented by $p(m^c_k(t)|E)$ can be made.

At 640, values associated with the inferences of 630 can be analyzed to determine one or more values that may be employed in inference formulae that are employed to determine a communication with a maximum utility. The inference formulae may be, for example, decision-theoretic formulae.

At 650, inference formulae may be employed to determine the maximum utility for a communication. In one example aspect of the present invention, a basic decision-theoretic formula employed in decision-making under uncertainty in the context of a contactee is:

$$A^* = \operatorname*{argmax}_j \sum_i p(context^R i | E) \times u(A_j, A^C_k, C, context^R i, context^C) \quad (1)$$

where A* is the ideal communication actions, which include the modalities employed by the contactor ($A^{C*}$) and contactee (Recipient) ($A^{R*}$) computed by optimizing Equation 1. In the equation, $A_j$ is the communication modality being considered, $A^C_k$ is the communication modality employed by the contactor, $context^R_i$ is the context of the contactee (Recipient) of the intended communication, $context^C$ is the context of the contactor, and C is the identity of the contactor, typically linked to a class of person (e.g., critical associate, previously replied to, family, unknown).

The basic formulation for identifying optimal communication modalities can be extended by introducing uncertainty about the contactor's context, which adds summing over the additional uncertainty to equation 1.

$$A^* = \operatorname*{argmax}_j \sum_i \sum_k p(context^R i | E) \quad (2)$$
$$p(context^C k | E) \times u(A_j, A^C_{init}, C, context^R i, context^C k)$$

Variables associated with contactor and/or contactee contexts can be treated as explicit deterministic or probabilistic factors in optimization processing associated with identifying the optimal communication modality. Thus, in equation 3, $m^c_k$ represents the modalities available to the contactor and thus equation 3 considers combinations of such modalities.

$$A^* = \operatorname*{argmax}_{l,n} \sum_i \sum_k p(context^R i | E) p(context^C k | E) \times \quad (3)$$
$$u(A(m^R_l, m^C_n), A^C_{init}, C, context^R i, context^C k)$$

The present invention may further compare the best option for communication available now with the best communication option that will be available later, and update the value of the communication for the losses based in delays in communication, and potential gains or losses based on changes in disruptiveness if the communication should come at the later time t when the contactee is in a different state (e.g., more available or less available).

$$ValueA*'(t_+) - ValueA*(t_0) = \quad (4)$$
$$\max_{l,n} \sum_i \sum_k p(context^R i | E, t_+) p(context^C k | E, t_+) \times u(A(m^R_l(t_+),$$
$$m^C_n(t_+)), A^C_{init}, C, context^R i(t_+), context^C k(t_+)) -$$
$$\max_{l,n} \sum_i \sum_k p(context^R i | E, t_0) p(context^C k | E, t_0) \times$$
$$u(A(m^R_l(t_0), m^C_n(t_0)), A^C_{init}, C, context^R i(t_0), context^C k(t_0))$$

The present invention also facilitates considering the value of delaying the communication and rescheduling it for a later time. As an example, assume that a contactor attempts to contact a contactee in real-time and the contactee is in an important meeting. The best option (e.g., one that maximizes utility) may be to reschedule a real-time conversation when the contactee is back from meeting, based on the calendar information or on statistics about the contactee's coming and going that facilitate predicting the contactee's likely availability. One aspect of the present invention may also consider the calendar of the contactor to arrange a mutually good time.

Thus, decision-theoretic formulae like those described in equations 1 through 4 may be employed at 650 to produce one or more expected utilities. In one example aspect of the present invention, a communication would automatically be initiated, scheduled and/or calendared based on such information. But in another aspect of the present invention, information concerning those expected utilities may be presented to one or more parties, as at 660. By way of illustration, a contactor may be presented with a list of communications with high utilities determined in accordance with the preferences of the contactee. The contactor may then select from the list.

Based, at least in part on the selection of 660, one or more communications may be initiated (e.g., phones dialed, email composer/receiver popped up), scheduled and/or calendared at 670. At 680 a determination is made concerning whether another communication is to be processed. If the determination at 680 is YES, then processing continues at 620, otherwise processing concludes.

Figure 7:
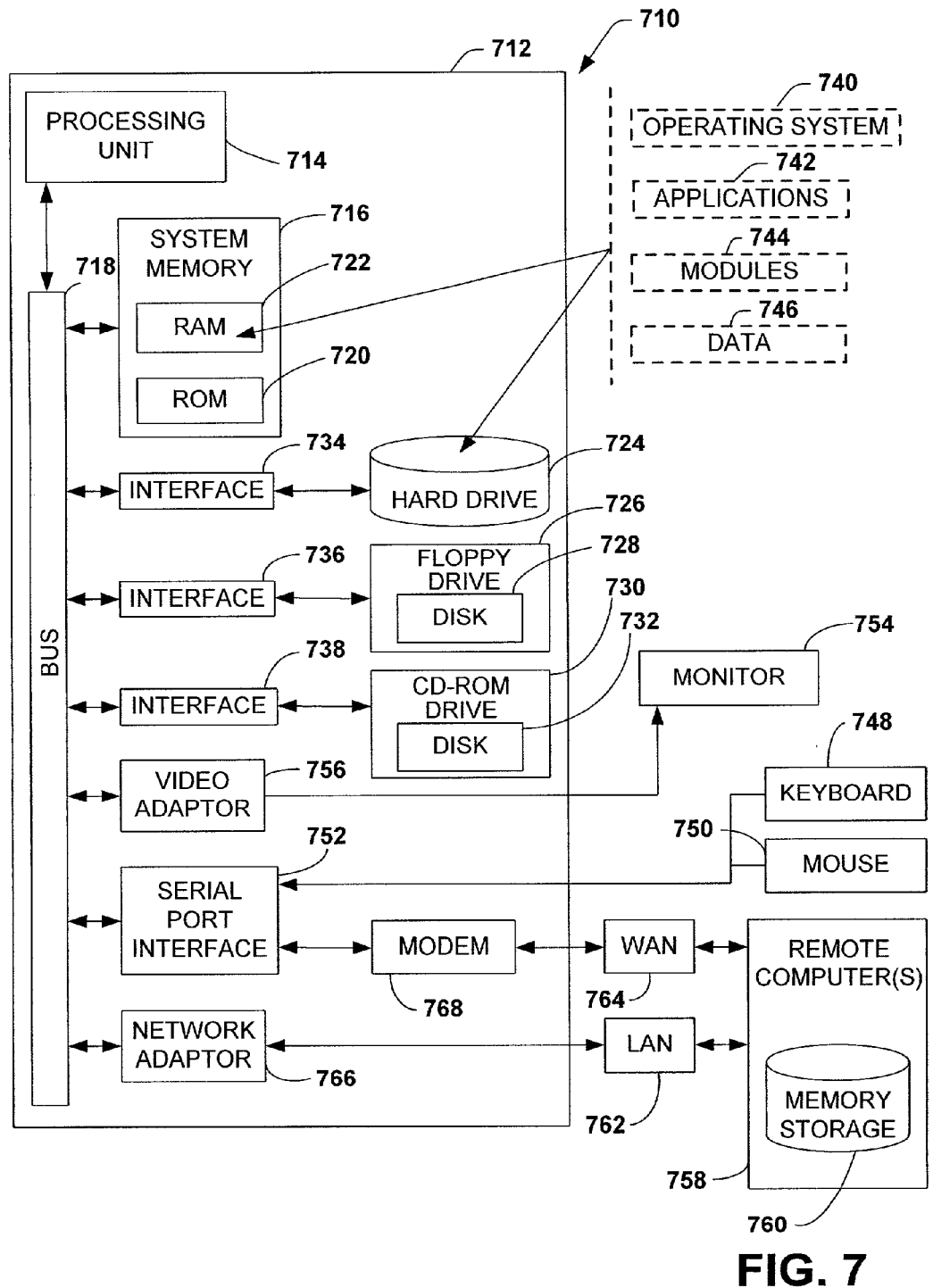
FIG. 7 is a schematic block diagram of an exemplary operating environment for a system configured in accordance with the present invention.

In order to provide additional context for various aspects of the present invention, FIG. 7 and the following discussion are intended to provide a brief, general description of a suitable computing environment 710 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 7, an exemplary environment 710 for implementing various aspects of the invention includes a computer 712, the computer 712 including a processing unit 714, a system memory 716 and a system bus 718. The system bus 718 couples system components including, but not limited to the system memory 716 to the processing unit 714. The processing unit 714 may be any of various commercially available processors. Dual microprocessors and other multi-processor architectures also can be employed as the processing unit 714.

The system bus 718 can be any of several types of bus structure including a memory bus or memory controller, a peripheral bus and a local bus using any of a variety of commercially available bus architectures. The system memory 722 includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, (e.g., to read from or write to a removable disk 728) and an optical disk drive 730, (e.g., for reading a CD-ROM disk 732 or to read from or write to other optical media). The hard disk drive 724, magnetic disk drive 726 and optical disk drive 730 can be connected to the system bus 718 by a hard disk drive interface 734, a magnetic disk drive interface 736 and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 722, including an operating system 740, one or more application programs 742, other program modules 744 and program data 746. It is to be appreciated that the present invention can be implemented with various commercially available operating systems or combinations of operating systems.

A user can enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754 or other type of display device is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance, a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752. In a networked environment, program modules depicted relative to the computer 712, or portions thereof, may be stored in the remote memory storage device 760. It will be appreciated that the network connections shown are exemplary and other means of establishing a communications link between the computers may be used.

Figure 8:
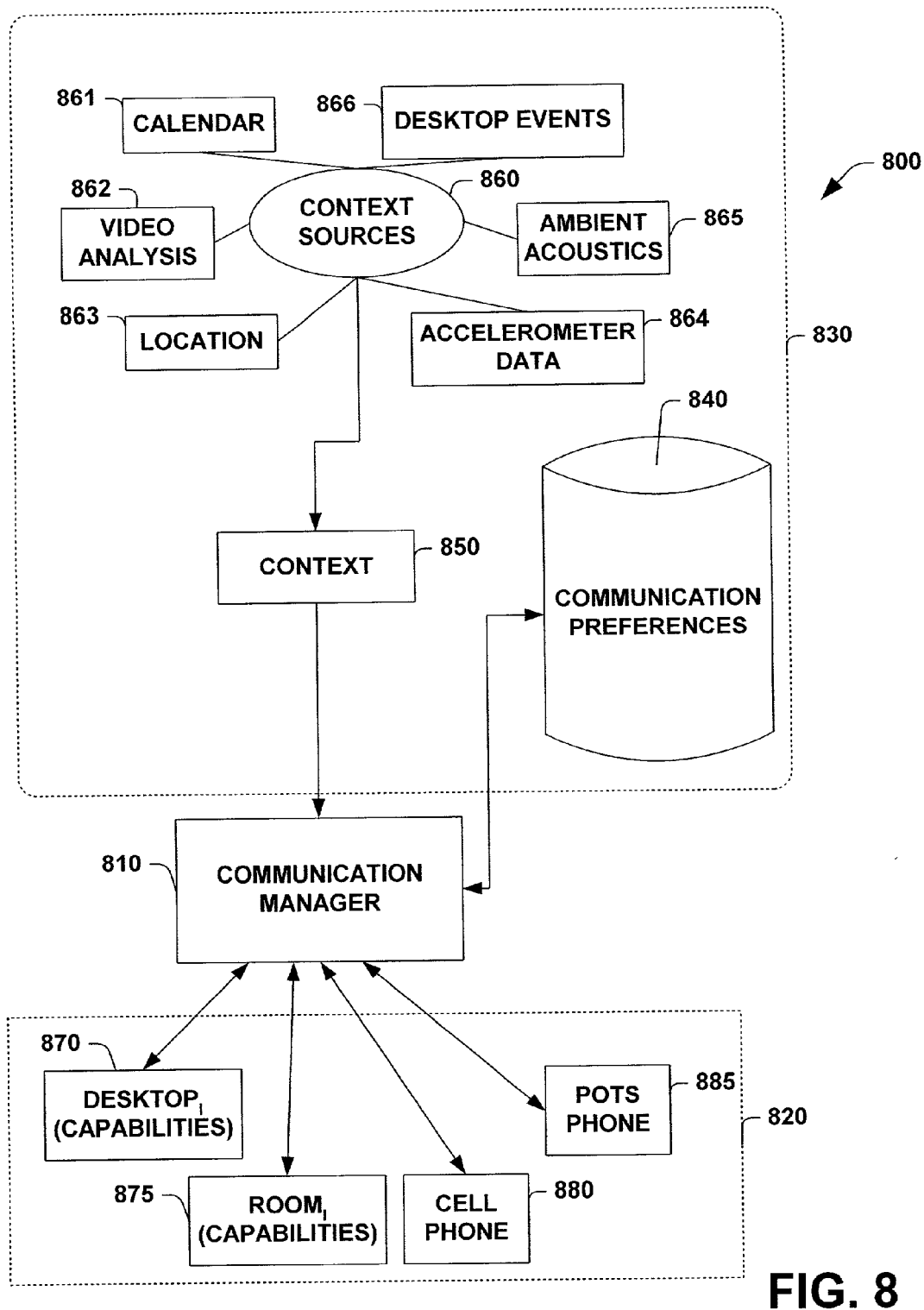
FIG. 8 is a schematic block diagram illustrating context awareness processing in accordance with an aspect of the present invention.

FIG. 8 illustrates an example system 800 that performs context awareness processing to facilitate identifying and establishing optimal communication modalities. The system 800 includes a communication manager 810 operably connected to a set 820 of possible communication modalities and a set 830 of information concerning how a communicating party would prefer to communicate and the context of the communicating party. The set 830 includes a communication preferences data store 840 and a context 850. The context 850 holds information collected from and/or inferred about context sources 860. The context sources can include, but are not limited to, calendar information 861, video analysis 862, location 863, accelerometer data 864, ambient acoustic information 865 and desktop events 866.

The context 850 may vary widely depending on the location and task of the contactee. For example, a first contactee in a car moving 85 m.p.h. during rush hour is likely to have one context while a second contactee in a car moving 5 m.p.h. during rush hour is likely to have a different context. Similarly, a contactee piloting a jet fighter that is on autopilot, in clear skies, with no enemies within a thousand miles is likely to have a different context than a pilot currently engaged by surface to air missiles over enemy territory. Closer to home, a parent of grade school aged children at home during school hours on a school day is likely to have a different context than the same parent in the car with the school aged children ten minutes before school starts.

The communication manager 810 examines the context 850 and the preferences 840 in light of the possible communication modalities currently available or likely to become available. The communication modalities can include, but are not limited to, a set 870 of desktops (e.g., person with more than one computer, person with alternate contacts (e.g., secretary, assistant)), a set 875 of room capabilities (e.g., person reachable in more than one meeting room, conference room, office), a cell phone 880 and a POTS telephone 885. After performing such analyses, the communication manager 810 is then available to engage or be engaged by other communicating parties employing the present invention, as illustrated in FIG. 9.

Figure 9:
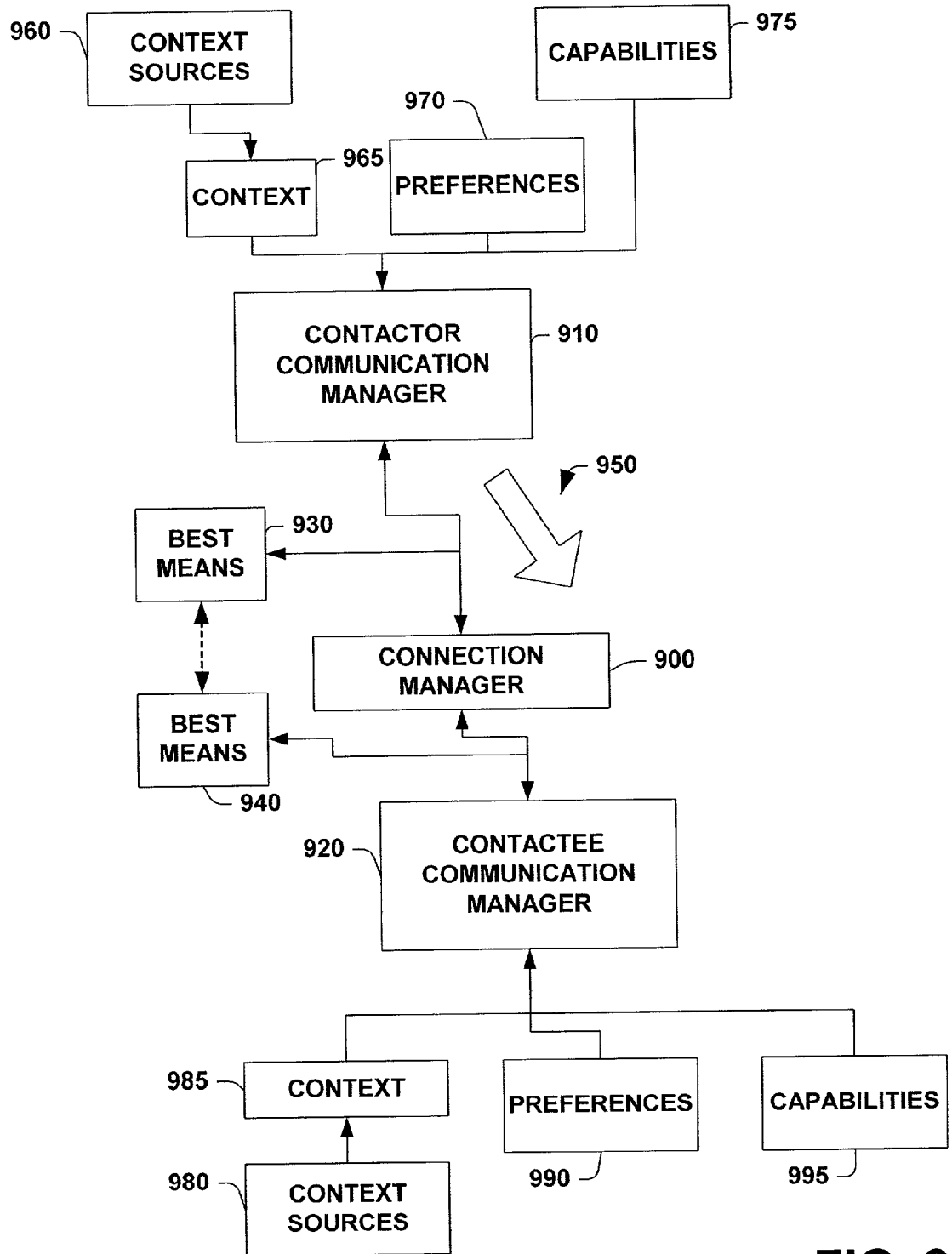
FIG. 9 illustrates processing associated with a contactor attempting a communication, in accordance with an aspect of the present invention.

FIG. 9 illustrates communicating parties employing the present invention and processing associated with a contactor attempting a communication. A connection manager 900 is operably connected to a contactor communication manager 910 and a contactee communication manager 920, where the contactor communication manager 910 and the contactee communication manager 920 are examples of the communication manager described in association with FIG. 8. The connection manager 900 communicates with the contactor communication manager 910 and the contactee communication manager 920 to acquire information employed in determining the optimal communication that can be achieved between a contactor best means 930 for communicating and a contactee best means 940 for communicating, employing, for example, the methods described in association with FIGS. 6 and 7.

The contactor communication manager 910, after gathering information and/or making inferences concerning a context 965 (derived from a plurality of context sources 960), preferences 970 and capabilities 975 may transmit contactor schema 950 to the connection manager 900. The schema 950 can hold information including, but not limited to, contactor identity, contactor history, registered documents, tasks, source modality, requested means and capabilities, for example. Similarly, the contactee communication manager 920 may be queried, for example, by the connection manager 900 for information including, but not limited to, contactee context 985 (derived from a plurality of context sources 980), contactee preferences 990 and contactee capabilities 995. It is to be appreciated that although the contactor communication manager 910 is described as transmitting data and the contactee communication manager 920 is described as being queried, that other data communication methods can be employed in accordance with the present invention.

The present invention provides for interacting with hardware and/or software to automatically establish the identified connections. Thus, the contactor in FIG. 9 may be able to make a first decision, that they would like to communicate with a contactee, select means for establishing the "best communication" and then wait for that "best communication" to be established. For example, a contactor word processing a document Of interest to a contactee may select a revision in the document and be presented with a menu of options concerning the revision. One of the options may be a "BestCom" option to communicate with the contactee. The person may then select the "BestCom" option, whereupon analysis associated with the present invention would be initiated to establish communications with the contactee. Such processing may cause the contactor to be presented with situations including, but not limited to, display of information concerning a phone conversation being scheduled for later, presentation of a herald that indicates that a telephone call is being put through immediately, an Instant Messenger input field popping up, an email composition form popping up with the appropriate contactee(s) populating the To: field, for example. The situation experienced by the contactor may be based on the contactee's preferences and context.

As mentioned above, a communication modality and/or a contactee may not be immediately available. Thus, the present invention includes methods for predicting the likelihood of when contactee(s) may be available, where such likelihoods can be employed in scheduling group meetings where the utility of the group experience of n participants, n being an integer, is maximized. For example, calendars for the n participants can be examined to infer times at which the participants are likely to be available to share in some modality (e.g., videoconferencing, collaborative editing). Automated meeting request(s) can be constructed from such analysis.

Figure 10:
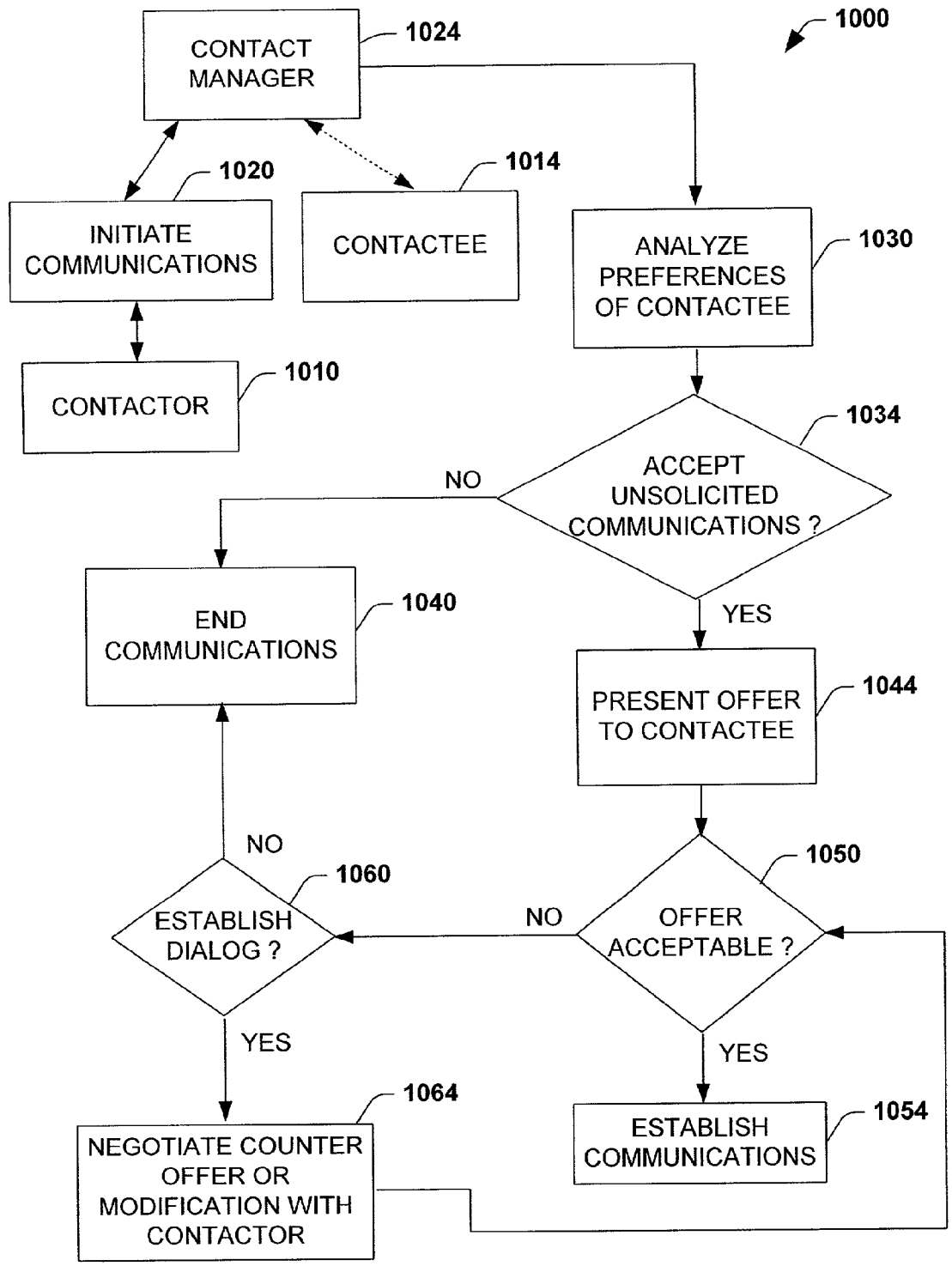
FIG. 10 illustrates a contact system and associated methodology for establishing communications between an unsolicited contactor and a contactee in accordance with an aspect of the present invention.

It is noted that communications between contactors and contactees can occur between unknown parties and can be negotiated, if desired. For example, and as described above, communications can be established via decision-making processes in the contact manager and include communications preferences of the contactors and contactees. The processes can include utility-based decisions that enable communications to be established according to a value of the communications to the respective parties. To highlight these principles, FIG. 10 illustrates a contact system 1000 and associated process for establishing communications between an unsolicited contactor 1010 and a contactee 1014 in accordance with an aspect of the present invention.

At 1020, a communications attempt is initiated by the unsolicited contactor 1010 and directed to a contact manager 1024 or other intermediary system (e.g., e-mail service, on-line messenger service, on-line phone service, and so forth). The communications attempt can include an offer to communicate and be included, described and/or updated as part of a preferences database (not shown) associated with the unsolicited contactor 1010 (See e.g., preference database reference numeral 264 in FIG. 2). The offer can include consideration and/or incentives for the contactee 1014 in order to induce a communication with the unsolicited contactor 1010. Offers and incentives can include a plurality of different forms and/or formats. For example, an offer can be directed such as "If you are willing to listen to, read, view, examine and/or interact with the following commercial, political ad, survey, infomercial or other type communication" then "You can receive the following incentive or consideration" (e.g., money, gifts, rebates, perks, discounts on other items and so forth).

Proceeding to 1030, the contact manager 1024 analyzes contactee preferences (See e.g., preference database reference numeral 254 in FIG. 2) regarding potential communications with contactors. At 1034, a determination is made as to whether unsolicited communications should occur based upon the preferences analyzed at 1030. For example, if the contactee's preference is set or configured to prevent any communications from an unknown or unsolicited contactor 1010, the process proceeds to 1040 wherein possible further communications are ended with the unsolicited contactor 1010. This can include sending communications or feedback via the contact manager 1024 to the unsolicited contactor 1010 indicating that further communications are not permitted or desired.

If unsolicited communications are acceptable at 1034, the process proceeds to 1044, wherein the unsolicited contactor's offer to communicate is presented or delivered to the contactee 1014. At 1050, the contact manager 1024 and/or contactee 1014 determines if the offer is acceptable. For example, contactee preferences can enable or describe a predetermined amount of messages to be received from a predetermined category or categories of message sources (e.g., OK to receive up to 10 messages or communications a day from any music supplier if my on-line music account is updated to receive a free CD from the supplier). If the offer is acceptable at 1050 (can include explicit preference overrides, desires and/or indications of acceptance by contactee 1014), communications are then established at 1054 between the unsolicited contactor 1010 and the contactee 1014. It is to be appreciated that an agreement to communicate between parties can include an agreement for future communications and can include past considerations.

If the offer to communicate is unacceptable at 1050, the process proceeds to 1060. At 1060, the parties are given an opportunity to participate in a dialog session. If either party (contactor or contactee) decides not to engage in the dialog, then the process proceeds to 1040 wherein further communications are ended. If a dialog is desired at 1060, the process proceeds to 1064 enabling the parties to further negotiate or modify the original offer presented at 1044 (e.g., discuss counter offer or modification from contactee 1014). The process depicted at 1050, 1060, 1064 can be repeated until communications are established at 1054 or communications are ended at 1040.

The present invention as described above, facilitates management of unsolicited communications and increases the utility of such communications to the contactee 1014 while increasing the value of such communications to the contactor 1010. The contact manager 1024, along with the preference databases, can be employed to control parameters such as time, place and manner that unsolicited communications of acceptable genres or types of communications are presented to a user or contactee. The contact manager 1024 facilitates communications between the contactor 1010 (and/or group of contactors) and one or more contactees 1014 concerning the parameters of the agreement between the parties regarding unsolicited communications.

By way of illustration, in return for a consideration (e.g., free cellular phone service) the contactee 1014 may agree to receive a pre-determined amount of unsolicited communications per month. The unsolicited communications can originate from various sources (e.g., car manufacturers, banks, credit card vendors), take different forms (e.g., cellular call, satellite call, POTs call, e-mail, paper mail, video call, fax, and so forth), be of varying length (e.g., short update, lengthy prospectus, very short reminder) and be presented at different times. Such various genres, forms and times may have different value to the unsolicited contactor 1010 and provide different utilities to the contactee 1014. For example, a phone call before the market has opened in the morning may be worth five times as much as an e-mail after the market has opened and may be worth ten times as much as a fax as the market close approaches. Thus, an agreed upon pre-determined value of unsolicited communications may be received through a wide variety of combinations of received communications.

To facilitate arranging an agreement between parties, in one example of the present invention, the contact manager 1024 can include an unsolicited communication agreement manager (not shown) and an unsolicited communication receipt tracker (not shown). The unsolicited communication agreement manager can be employed, for example, to arrange the parameters (e.g., preferred modalities, preferred times, preferred communication topics (e.g., stocks, news, mortgage rates), total value to unsolicited communicator, calculation period, and so forth)) of the agreement between the parties. The unsolicited communication receipt tracker can be employed, for example, to monitor properties such as the value of received communications and the remaining value required to satisfy the agreement.

In one example of the present invention, the system 1000 may further include a consideration calculator (not shown) that can be employed, for example, to determine the amount of benefit that the contactee 1014 should receive from the unsolicited contactor 1010 based, at least in part, on the total value of unsolicited communications received during a calculation period. By way of illustration, although a first contactee can agree to receive unsolicited communications, the contactee may have been too busy during a calculation period to accept any such unsolicited communications. Thus, the consideration calculator can be employed to determine that the contactee should not receive any consideration. By way of further illustration, a second contactee may have received a large value of unsolicited communications during a calculation period and thus the consideration calculator may be employed to determine that the contactee should receive a bonus consideration above and beyond as subscribed for consideration (e.g., gift certificate in addition to free cellular service).

Although contactee's 1014 may initially identify preferred modalities (e.g., time, place, method) for receiving unsolicited communications, when an unsolicited communication is presented in accordance with such preferences, the contactee 1014 can decide (e.g., configure preference), for example, to not receive the communication, to schedule it for a later time, to change the communication modality and/or to accept the communication as offered, for example. Thus, the contactee 1014 has the opportunity to increase the utility of unsolicited communications, which in turn increases the value of the communication to the unsolicited contactor 1010.

It is noted that the components described above for handling unsolicited communications can also be extended to include a contingency-based policy(s) and/or decision(s) that guide payment and reimbursement for handling uncertainty in the identity of the contactee 1014 and/or the content of the contactee's communication. With contingency-based policy, for example, unsolicited or unrecognized contactors 1010 can be forced by default (e.g., via policy provided in preferences database) to provide payments or consideration to the contactee 1014 to access one or more modalities for communicating with that contactee 1014. However, efficient controls can be provided that enable the contactee 1014 to render the communication cost-free or less expensive for the contactor 1010 following the contactee's recognition of the contactor and/or following an analysis of the content of the communication.

Such policies can enable various functionalities. For example, the contingency-based approach enables contactees 1014 to accept communications from contactors 1010 with whom the contactee's actually desire to communicate with, but who are not yet registered nor recognized as known entities. Thus, the system 1000 enables access to the contactee 1014 at an upfront fee or other consideration that may be removed by permission of the contactee following recognition of the contactor 1010 by the contactee.

Therefore, as an example, people or other contactors may not be registered as a recognizable identity in a database of people who can communicate—or communicate via particular channels (e.g., phone communication) and/or per particular contextual states of the contactee—with the contactee. Friends, family, and colleagues who are unrecognized by the system could gain access (and perhaps become registered for future payment-free access) by committing to pay "up front" to gain access. However, these people can be reimbursed as soon as the contactee 1014 recognizes the caller and decides to make the communication cost free. As another example, an unsolicited caller or contactor 1010 interested in doing targeted sales may pay to access a contactee 1014, yet be reimbursed for the cost of the communication given a successful sales or, more generally, a decision of the contactee 1014 to reduce or remove the default payment made up front by the contactor 1010 for accessing the contactee 1014. This can occur, for example, if the contactee 1014 determines that the call, service and/or content that stemmed from the communication is actually desired after contact is made.

It is to be appreciated that aspects of the present invention may be embodied in a computer readable medium such that a computer readable medium can store computer executable components for a system that facilitates communication between entities in accordance with the present invention. For example the computer executable components can comprise an identifying component that identifies a plurality of communication modalities that respectively provide for communication between at least two entities. Furthermore, the computer executable components can comprise an analyzing component that analyzes a first communication data set associated with a first entity and a second communication data set associated with a second entity, the analyzing component identifying one or more communication modalities of the plurality of modalities based at least in part on analysis of the first and second communication data sets and the analyzing component establishing a communication between the entities.

What has been described above includes examples of the present invention. It is of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising", as comprising is interpreted as a transitional word in a claim.

What is claimed is:

1. A system to facilitate communications between parties, comprising:
   a first component associated with a request for attentional resources of a contactee, the first component is a contactor data store that includes preferences of a contactor relating to the request;
   a second component that facilitates a response to the request based in part on the utility of the request to the contactee, the second component is a contactee data store that includes preferences of the contactee relating to at least one of the request and the response; and
   a contact manager to facilitate communications between the contactor and the contactee based in part on the preferences of the parties, the request and the response, the contact manager including decision-theoretic formulae to facilitate communications between the parties, the decision-theoretic formulae including the following equation:

$$A^* = \underset{j}{\arg\max} \sum_i p(context^R i | E) \times u(A_j, A_k^C, C, context^R i, context^C)$$

$A_j$ is a communication modality being considered;
$A^C_k$ is a communication modality employed by the contactor;
$context^R_i$ is a context of the contactee;
$context^C$ is a context of the contactor;
C is an identity of the contactor; and
$p(context^R_i|E)$ is a conditional probability that the contactee has a certain context given the evidence E and is employed with a utility function u to determine ideal communication actions that maximize the utility of communications between the contactor and the contactee.

2. The system of claim 1, the request includes at least one of the contactor's capabilities, goals, tasks, schedules, priorities, deadlines, costs, and benefits in order to maximize the utility to the contactee.

3. The system of claim 1, the response including at least one of the capabilities of the contactee, the contactee's preferences relating to the contactor's preferences and how the contactee prefers to be contacted, the preferences of being contacted varying in respect to the contactor over at least one of time and topics of communication.

4. The system of claim 3, the contactee restricts communications of a selected group of contactor's over time via at least one of actions by the contactee and by modifying the preferences in the contactee preferences data store.

5. The system of claim 1, the contactor optimizes at least one of a measure of priority and a measure of value to facilitate communications between the parties.

6. The system of claim 1, the contact manager optimizes at least one of a measure of priority and a measure of value to facilitate communications between the parties.

7. The system of claim 1, the preferences of at least one of the contactor and the contactee including at least one of a time of day for communicating, a time of week for communicating, identity of the contactor that includes the identity of unknown contactors, hardware currently available, hardware available within a time horizon of a communication attempt, software available, and interruptability information.

8. The system of claim 1, the contactee data store including dynamically changing communication information relating to needs of the contactee.

9. The system of claim 1, the contact manager facilitates communications between at least one of multiple parties and multiple communications channels.

10. The system of claim 1, the contact manager enabling a dialog session between the contactor and the contactee to facilitate communications between the parties.

11. The system of claim 1, the contact manager informs the contactee of the contactor's attempt to communicate, the contactee is provided with an opportunity to override current preferences in the contactee data store based on current capabilities of the contactee.

12. The system of claim 1, the contactee is presented a list of options for being contacted via the contact manager.

13. The system of claim 1, the contactor is presented with a list of communications options with high utilities determined in accordance with the preferences of the contactee via the contact manager.

14. The system of claim 1, the contact manager is operably associated with at least one of an e-mail, a video transmission, a television transmission, a telephone, a mobile communications device, an instant message and a computing device.

15. The system of claim 1, the contact manager including at least one of a set of rules and a set policies to facilitate communications between the parties.

16. A method to facilitate communications between parties, comprising:
    communicating a first set of preferences to send information;
    communicating a second set of preferences to receive the information; and
    enabling communications between two or more parties based at least in part on the preferences and decision-theoretic formulae, the decision-theoretic formulae including the following equation:

$$A^* = \underset{j}{\operatorname{argmax}} \sum_i p(context^R i \mid E) \times u(A_j, A_k^C, C, context^R i, context^C)$$

$A_j$ is a communication modality being considered;
$A^C_k$ is a communication modality employed by a contactor;
$context^R_i$ is a context of a contactee;
$context^C$ is a context of the contactor;
C is an identity of the contactor; and
$p(context^R_i|E)$ is a conditional probability that the contactee has a certain context given the evidence E and is employed with a utility function u to determine ideal communication actions that maximize the utility of communications between the contactor and the contactee.

17. The method of claim 16, further comprising transmitting one or more selection options from a first party requesting attentional resources of a second party, the communications between the parties based at least in part on the selected option.

18. The method of claim 17, further comprising,
    enabling at least one party to override the preferences in order to receive further communications from the first party.

19. The method of claim 16, further comprising,
    transmitting a list of options to at least one party, the list arranged according the communications preferences of at least one other party.

20. The method of claim 16, further comprising,
    enabling a dialog session between the parties to facilitate further communications between the parties.

21. A computer-readable medium having computer-executable instructions for performing the acts of claim 16.

22. A system to facilitate communications between parties, comprising:
    means for specifying preferences to send and receive communications;
    means for transmitting one or more selection options requesting the attention of at least one party via the communications; and
    means for enabling further communications between the parties based at least in part on the preferences the selected option and decision-theoretic formulae, the decision-theoretic formulae including the following equation:

$$A^* = \underset{j}{\operatorname{argmax}} \sum_i p(context^R i \mid E) \times u(A_j, A_k^C, C, context^R i, context^C)$$

$A_j$ is a communication modality being considered;
$A^C_k$ is a communication modality employed by a contactor;
$context^R_i$ is a context of a contactee;
$context^C$ is a context of the contactor;
C is an identity of the contactor; and
$p(context^R_i|E)$ is a conditional probability that the contactee has a certain context given the evidence E and is employed with a utility function u to determine ideal communication actions that maximize the utility of communications between the contactor and the contactee.

23. A system to facilitate unsolicited communications between parties, comprising:
    a contact manager to transmit an offer to communicate from an unknown contactor to a contactee, the contact manager including decision-theoretic formulae, the decision-theoretic formulae including the following equation:

$$A^* = \underset{j}{\operatorname{argmax}} \sum_i p(context^R i \mid E) \times u(A_j, A_k^C, C, context^R i, context^C)$$

$A_j$ is a communication modality being considered;
$A^C_k$ is a communication modality employed by a contactor;
$context^R_i$ is a context of a contactee;
$context^C$ is a context of the contactor;
C is an identity of the contactor; and
$p(context^R_i|E)$ is a conditional probability that the contactee has a certain context given the evidence E and is employed with a utility function u to determine ideal communication actions that maximize the utility of communications between the contactor and the contactee; and a preference component associated with the contactee to enable an acceptance of the offer based in part upon consideration presented in the offer.

24. The system of claim 23, further comprising a preference component associated with the unknown contactor to describe one or more parameters of the offer.

25. The system of claim 23, the offer includes a request to at least one of listen, view, examine and interact with at least one of a commercial, political ad, survey, and infomercial.

26. The system of claim 23, the consideration includes at least one of money, gifts, rebates, perks, and discounts on other items.

27. The system of claim 23, the contact manager automatically disables further communications with the unknown contactor based upon settings in the preference component associated with the contactee.

28. The system of claim 27, the contact manager provides feedback to the unknown contactor indicating whether communications are established with the contactee.

29. The system of claim 23, at least one of the contact manager and the contactee enable further communications via acceptance of the offer.

30. The system of claim 29, the acceptance includes an agreement to communicate in the future.

31. The system of claim 29, the acceptance is based upon past consideration.

32. The system of claim 23, the preference component enables a predetermined amount of messages to be received from a predetermined number of message sources.

33. The system of claim 23, the contact manager enables a dialog session to facilitate an agreement to communicate between the unknown contactor and the contactee.

34. The system of claim 23, further comprising an agreement component to at least one of arrange parameters, modalities, times, topics, and value between the unsolicited contactor and the contactee.

35. The system of claim 34, further comprising a receipt component to monitor properties of the agreement between the unsolicited contactor and the contactee.

36. The system of claim 35, further comprising a consideration calculator to adjust one or more parameters of the agreement.

37. A method to facilitate communications between unknown parties, comprising:

transmitting an offer having at least one incentive to induce communications between parties;

analyzing preference data associated with at least one of the parties; and establishing communications between the parties based at least in part on the preference data, the at least one incentive, actions between the parties and decision-theoretic formulae, the decision-theoretic formulae including the following equation:

$$A^* = \underset{j}{\operatorname{argmax}} \sum_i p(context^R i | E) \times u(A_j, A_k^C, C, context^R i, context^C)$$

$A_j$ is a communication modality being considered;
$A^C_k$ is a communication modality employed by a contactor;
$context^R_i$ is a context of a contactee;
$context^C$ is a context of the contactor;
C is an identity of the contactor; and
$p(context^R_i|E)$ is a conditional probability that the contactee has a certain context given the evidence E and is employed with a utility function u to determine ideal communication actions that maximize the utility of communications between the contactor and the contactee.

38. The method of claim 37, further comprising determining whether to present the offer to one of the parties based on the preference data.

39. The method of claim 38, further comprising disabling further communications between the parties based on the preference data.

40. The method of claim 37, further comprising providing feedback to at least one of the parties regarding the ability of the other party to communicate.

41. The method of claim 37, further comprising establishing a dialog to enable further negotiations of the offer.

42. A computer-readable medium having computer-executable instructions for performing the acts of claim 37.

43. A system to facilitate communications between unknown parties, comprising:

means for transmitting an offer to induce communications between parties;

means for analyzing preference data associated with at least one of the parties;

means for establishing communications between the parties based at least in part on the preference data, actions between the parties and decision-theoretic formulae, the decision-theoretic formulae including the following equation:

$$A^* = \underset{j}{\operatorname{argmax}} \sum_i p(context^R i | E) \times u(A_j, A_k^C, C, context^R i, context^C)$$

$A_j$ is a communication modality being considered;
$A^C_k$ is a communication modality employed by a contactor;
$context^R_i$ is a context of a contactee;
$context^C$ is a context of the contactor;
C is an identity of the contactor; and
$p(context^R_i|E)$ is a conditional probability that the contactee has a certain context given the evidence E and is employed with a utility function u to determine ideal communication actions that maximize the utility of communications between the contactor and the contactee; and means for negotiating the offer.

* * * * *

UNITED STATES PATENT AND TRADEMARK OFFICE
CERTIFICATE OF CORRECTION

PATENT NO. : 6,988,132 B2  Page 1 of 1
APPLICATION NO. : 09/982306
DATED : January 17, 2006
INVENTOR(S) : Eric Horvitz It is certified that error appears in the above-identified patent and that said Letters Patent is hereby corrected as shown below:

In column 15, line 34, delete "$context_{Ri}$" and insert -- $context^{R}_{i}$ --, therefor.

In column 28, line 14, delete "Of" and insert -- of --, therefor.

In column 34, line 60, in Claim 23, after "employed by" delete "a" and insert -- the --, therefor.

In column 34, line 62, in Claim 23, after "of" delete "a" and insert -- the --, therefor.

Signed and Sealed this

Twenty-third Day of March, 2010

David J. Kappos
*Director of the United States Patent and Trademark Office*